United States Patent
Abedini et al.

(10) Patent No.: US 10,448,346 B2
(45) Date of Patent: Oct. 15, 2019

(54) SYNCHRONIZATION SIGNAL DESIGN

(71) Applicant: QUALCOMM Incorporated, San Diego, CA (US)

(72) Inventors: Navid Abedini, Raritan, NJ (US); Bilal Sadiq, Basking Ridge, NJ (US); Sundar Subramanian, Bridgewater, NJ (US); Junyi Li, Chester, NJ (US); Muhammad Nazmul Islam, Edison, NJ (US); Atul Maharshi, South Orange, NJ (US); Juergen Cezanne, Ocean Township, NJ (US); Ashwin Sampath, Skillman, NJ (US)

(73) Assignee: Qualcomm Incorporated, San Diego, CA (US)

( * ) Notice: Subject to any disclaimer, the term of this patent is extended or adjusted under 35 U.S.C. 154(b) by 39 days.

(21) Appl. No.: 15/713,167

(22) Filed: Sep. 22, 2017

(65) Prior Publication Data
US 2018/0139712 A1   May 17, 2018

Related U.S. Application Data

(60) Provisional application No. 62/421,209, filed on Nov. 11, 2016.

(51) Int. Cl.
| | | |
|---|---|---|
| *H04L 12/28* | (2006.01) | |
| *H04W 56/00* | (2009.01) | |
| *H04L 27/26* | (2006.01) | |

(52) U.S. Cl.
CPC ..... *H04W 56/0005* (2013.01); *H04L 27/2613* (2013.01); *H04L 27/2657* (2013.01);
(Continued)

(58) Field of Classification Search
None
See application file for complete search history.

(56) References Cited

U.S. PATENT DOCUMENTS

| | | |
|---|---|---|
| 9,480,006 B2 | 10/2016 | Malladi et al. |
| 2009/0131037 A1* | 5/2009 | Malladi ............... H04J 11/0069 |
| | | 455/422.1 |

(Continued)

OTHER PUBLICATIONS

CATT: "NR Initial Access Procedure With Multi-Stage Synchronization Signals", 3GPP Draft; R1-1611374, 3rd Generation Partnership Project (3GPP), Mobile Competence Centre; 650, Route Des Lucioles; F-06921 Sophia-Anti Polls Cedex; France, vol. RAN WG1, No. Reno, NV, USA: Nov. 14, 2016-Nov. 18, 2016 Nov. 5, 2016, XP051189908, Retrieved from the Internet: URL:http://www.3gpp.org/ftp/tsg_ran/WG1_RL1/TSGR1_87/Docs/ [retrieved on Nov. 5, 2016], 5 pages.

(Continued)

*Primary Examiner* — Ajit Patel
*Assistant Examiner* — Lionel Preval
(74) *Attorney, Agent, or Firm* — Holland & Hart LLP

(57) ABSTRACT

Methods, systems, and devices for wireless communication are described that provide for the indication of communication information using a correlation between synchronization signals transmitted by a base station for cell acquisition. The communication information may include a physical channel timing parameter such as synchronization periodicity, a physical broadcast channel (PBCH) periodicity, a beam sweep periodicity, or a cyclic prefix (CP) type. Communication information may also indicate the presence of a physical broadcast channel (PBCH) transmission or a mobility reference signal (MRS) transmission. The correlation may be a phase shift between multiple signals or may be based on precoding matrices used during transmission processing of the synchronization signals across subcarriers and antenna ports.

30 Claims, 15 Drawing Sheets

(52) U.S. Cl.
CPC ...... *H04L 27/2666* (2013.01); *H04L 27/2675* (2013.01); *H04L 27/2692* (2013.01); *H04W 56/00* (2013.01); *H04W 56/0035* (2013.01)

(56) References Cited

U.S. PATENT DOCUMENTS

| | | |
|---|---|---|
| 2011/0188465 A1 | 8/2011 | Han et al. |
| 2014/0092861 A1 | 4/2014 | Gao et al. |
| 2015/0124729 A1* | 5/2015 | Lee .................... H04L 5/001 370/329 |
| 2018/0115355 A1* | 4/2018 | Nagata ................ H04W 16/28 |

OTHER PUBLICATIONS

International Search Report and Written Opinion—PCT/US2017/053317—ISA/EPO—dated Jan. 3, 2018.

* cited by examiner

SYNCHRONIZATION SIGNAL DESIGN

CROSS REFERENCES

The present Application for Patent claims priority to U.S. Provisional Patent Application No. 62/421,209 by Abedini, et al., entitled "SYNCHRONIZATION SIGNAL DESIGN," filed Nov. 11, 2016, assigned to the assignee hereof.

BACKGROUND

The following relates generally to wireless communication, and more specifically to synchronization signal design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system or a New Radio (NR) system). A wireless multiple-access communications system may include a number of base stations or access network nodes, each simultaneously supporting communication for multiple communication devices, which may be otherwise known as user equipment (UE).

In wireless communication systems, such as an LTE system, multiple synchronization signals are used for cell acquisition. One signal is a primary synchronization signal (PSS), which is used for timing and frequency synchronization and may also indicate a portion of the cell identifier (ID) associated with a given cell. In LTE systems, for instance, there are three different PSS sequences, each of which is generated using a different Zadoff-Chu root. A secondary synchronization signal (SSS) may carry additional synchronization information and system information such as the remaining portion of the cell ID and the frame boundary index. These synchronization signals may be transmitted from a base station to a UE over adjacent symbols using one or more sub-carriers of a carrier frequency.

SUMMARY

The described techniques relate to improved methods, systems, devices, or apparatuses that support synchronization signal design. Generally, the described techniques provide for the communication of information based on a channel correlation between synchronization signals. In some cases, this information may indicate a physical channel timing parameter, a physical channel presence indicator, or a system information parameter.

The channel correlation may indicate a phase shift between two or more signals such as synchronization signals (e.g., primary synchronization signal (PSS), secondary synchronization signal (SSS)), broadcast channels (e.g., physical broadcast channel (PBCH), demodulation reference signals (DMRS) for PBCH, beam reference signals, channel reference signals, or other timing reference signals). The channel correlation may also be associated with a precoding matrix used for transmission of the synchronization reference signals or broadcast channels. In some instances, channel estimations for each of multiple synchronization signals may be compared and based on the comparison, the precoding matrix used for transmission may be determined. Based on the channel correlation or channel estimate(s), various communication information may be transmitted or received.

A method of wireless communication is described. The method may include receiving a first synchronization signal during a first set of resources and a second synchronization signal during a second set of resources, the first and second synchronization signals associated with a cell, determining a first channel estimation for the first synchronization signal and a second channel estimation for the second synchronization signal, obtaining communication information based at least in part on a channel correlation between the first channel estimation and the second channel estimation, and communicating, with a base station, based at least in part on the communication information.

An apparatus for wireless communication is described. The apparatus may include means for receiving a first synchronization signal during a first set of resources and a second synchronization signal during a second set of resources, the first and second synchronization signals associated with a cell, means for determining a first channel estimation for the first synchronization signal and a second channel estimation for the second synchronization signal, means for obtaining communication information based at least in part on a channel correlation between the first channel estimation and the second channel estimation, and means for communicating, with a base station, based at least in part on the communication information.

Another apparatus for wireless communication is described. The apparatus may include a processor, memory in electronic communication with the processor, and instructions stored in the memory. The instructions may be operable to cause the processor to receive a first synchronization signal during a first set of resources and a second synchronization signal during a second set of resources, the first and second synchronization signals associated with a cell, determine a first channel estimation for the first synchronization signal and a second channel estimation for the second synchronization signal, obtain communication information based at least in part on a channel correlation between the first channel estimation and the second channel estimation, and communicate, with a base station, based at least in part on the communication information.

A non-transitory computer readable medium for wireless communication is described. The non-transitory computer-readable medium may include instructions operable to cause a processor to receive a first synchronization signal during a first set of resources and a second synchronization signal during a second set of resources, the first and second synchronization signals associated with a cell, determine a first channel estimation for the first synchronization signal and a second channel estimation for the second synchronization signal, obtain communication information based at least in part on a channel correlation between the first channel estimation and the second channel estimation, and communicate, with a base station, based at least in part on the communication information.

In some examples of the method, apparatus, and non-transitory computer-readable medium described above, obtaining the communication information comprises: determining a phase shift between the first synchronization signal and the second synchronization signal based at least in part on the first channel estimation and the second channel estimation on a set of sub-carriers. Some examples of the method, apparatus, and non-transitory computer-readable medium described above may further include processes, features, means, or instructions for determining the communication information based at least in part on the phase shift.

In some examples of the method, apparatus, and non-transitory computer-readable medium described above, obtaining the communication information comprises: determining a first channel estimation difference between the first channel estimation and the second channel estimation for a first set of sub-carriers. Some examples of the method, apparatus, and non-transitory computer-readable medium described above may further include processes, features, means, or instructions for determining a second channel estimation difference between the first channel estimation and the second channel estimation for a second set of sub-carriers. Some examples of the method, apparatus, and non-transitory computer-readable medium described above may further include processes, features, means, or instructions for determining one or more information bits corresponding to the communication information based at least in part on the first and second channel estimation differences.

In some examples of the method, apparatus, and non-transitory computer-readable medium described above, the determining the one or more information bits comprises determining a precoding matrix applied to transmission of the first synchronization signal and the second synchronization signal via a plurality of antenna ports.

In some examples of the method, apparatus, and non-transitory computer-readable medium described above, the first synchronization signal may be a primary synchronization signal and the second synchronization signal may be a secondary synchronization signal. In some examples of the method, apparatus, and non-transitory computer-readable medium described above, the first synchronization signal may be one of a primary synchronization signal or a secondary synchronization signal, and the second synchronization signal may be a DMRS signal. Alternatively, in some examples of the method, apparatus, and non-transitory computer-readable medium described above, the first synchronization signal may be one of a first DMRS signal or a first beam reference signal, and the second synchronization signal may be one of a second DMRS signal or a second beam reference signal.

Some examples of the method, apparatus, and non-transitory computer-readable medium described above may further include processes, features, means, or instructions for demodulating a broadcast channel based at least in part on the first synchronization signal, the second synchronization signal, or a combination thereof.

In some examples of the method, apparatus, and non-transitory computer-readable medium described above, the communication information indicates a physical channel timing parameter, a physical channel presence indicator, or a system information parameter.

In some examples of the method, apparatus, and non-transitory computer-readable medium described above, the physical channel timing parameter comprises an indicator of any of a synchronization periodicity, a PBCH periodicity, a beam sweep periodicity, a cyclic prefix (CP) type, a part of the system frame number, a part of the symbol index, or combinations thereof.

In some examples of the method, apparatus, and non-transitory computer-readable medium described above, the physical channel presence indicator comprises an indicator of any of a PBCH transmission, a mobility reference signal (MRS) transmission, a channel reference signal transmission, a beam reference signal transmission, or combinations thereof.

A method of wireless communication is described. The method may include identifying communication information associated with a cell, determining a precoding relationship between a first synchronization signal and a second synchronization signal, the precoding relationship indicating the communication information, and transmitting, based at least in part on the precoding relationship, the first synchronization signal during a first set of resources and the second synchronization signal during a second set of resources.

An apparatus for wireless communication is described. The apparatus may include means for identifying communication information associated with a cell, means for determining a precoding relationship between a first synchronization signal and a second synchronization signal, the precoding relationship indicating the communication information, and means for transmitting, based at least in part on the precoding relationship, the first synchronization signal during a first set of resources and the second synchronization signal during a second set of resources.

Another apparatus for wireless communication is described. The apparatus may include a processor, memory in electronic communication with the processor, and instructions stored in the memory. The instructions may be operable to cause the processor to identify communication information associated with a cell, determine a precoding relationship between a first synchronization signal and a second synchronization signal, the precoding relationship indicating the communication information, and transmit, based at least in part on the precoding relationship, the first synchronization signal during a first set of resources and the second synchronization signal during a second set of resources.

A non-transitory computer readable medium for wireless communication is described. The non-transitory computer-readable medium may include instructions operable to cause a processor to identify communication information associated with a cell, determine a precoding relationship between a first synchronization signal and a second synchronization signal, the precoding relationship indicating the communication information, and transmit, based at least in part on the precoding relationship, the first synchronization signal during a first set of resources and the second synchronization signal during a second set of resources.

In some examples of the method, apparatus, and non-transitory computer-readable medium described above, the determining the precoding relationship comprises establishing a phase shift between the first synchronization signal and the second synchronization signal. In some examples of the method, apparatus, and non-transitory computer-readable medium described above, the transmitting the first and second synchronization signals may be based at least in part on the phase shift.

In some examples of the method, apparatus, and non-transitory computer-readable medium described above, the determining the precoding relationship comprises determining a precoding matrix for transmission of the first synchronization signal and the second synchronization signal via a plurality of antenna ports. In some examples of the method, apparatus, and non-transitory computer-readable medium described above, the transmitting the first and second synchronization signals may be based at least in part on the precoding matrix.

In some examples of the method, apparatus, and non-transitory computer-readable medium described above, the transmitting comprises transmitting a plurality of synchronization signal blocks comprising the first synchronization signal and the second synchronization signal with different beamforming coefficients.

In some examples of the method, apparatus, and non-transitory computer-readable medium described above, the first synchronization signal may be a primary synchronization signal and the second synchronization signal may be a secondary synchronization signal. In some examples of the method, apparatus, and non-transitory computer-readable medium described above, the first synchronization signal may be one of a primary synchronization signal or a secondary synchronization signal, and the second synchronization signal may be a DMRS signal. Alternatively, in some examples of the method, apparatus, and non-transitory computer-readable medium described above, the first synchronization signal may be one of a first DMRS signal or a first beam reference signal, and the second synchronization signal may be one of a second DMRS signal or a second beam reference signal.

In some examples of the method, apparatus, and non-transitory computer-readable medium described above, the communication information indicates a physical channel timing parameter, a physical channel presence indicator, or a system information parameter.

In some examples of the method, apparatus, and non-transitory computer-readable medium described above, the physical channel timing parameter comprises an indicator of any of a synchronization periodicity, a PBCH periodicity, a beam sweep periodicity, a CP type, a part of the system frame number, a part of the symbol index, or combinations thereof.

In some examples of the method, apparatus, and non-transitory computer-readable medium described above, the physical channel presence indicator comprises an indicator of any of a PBCH transmission, an MRS transmission, a beam or channel reference signal transmission, or combinations thereof.

Some examples of the method, apparatus, and non-transitory computer-readable medium described above may further include processes, features, means, or instructions for transmitting, based at least in part on the determined precoding relationship, a PBCH during a third set of resources.

In some examples of the method, apparatus, and non-transitory computer-readable medium described above, transmitting the PBCH comprises: establishing a phase shift between the PBCH and either the first synchronization signal or the second synchronization signal. Some examples of the method, apparatus, and non-transitory computer-readable medium described above may further include processes, features, means, or instructions for transmitting the PBCH based at least in part on the phase shift.

In some examples of the method, apparatus, and non-transitory computer-readable medium described above, transmitting the PBCH comprises: determining a precoding matrix for transmission of the PBCH via a plurality of antenna ports based at least in part on the determined precoding relationship. Some examples of the method, apparatus, and non-transitory computer-readable medium described above may further include processes, features, means, or instructions for transmitting the PBCH based at least in part on the precoding matrix.

DETAILED DESCRIPTION

Figure 1:
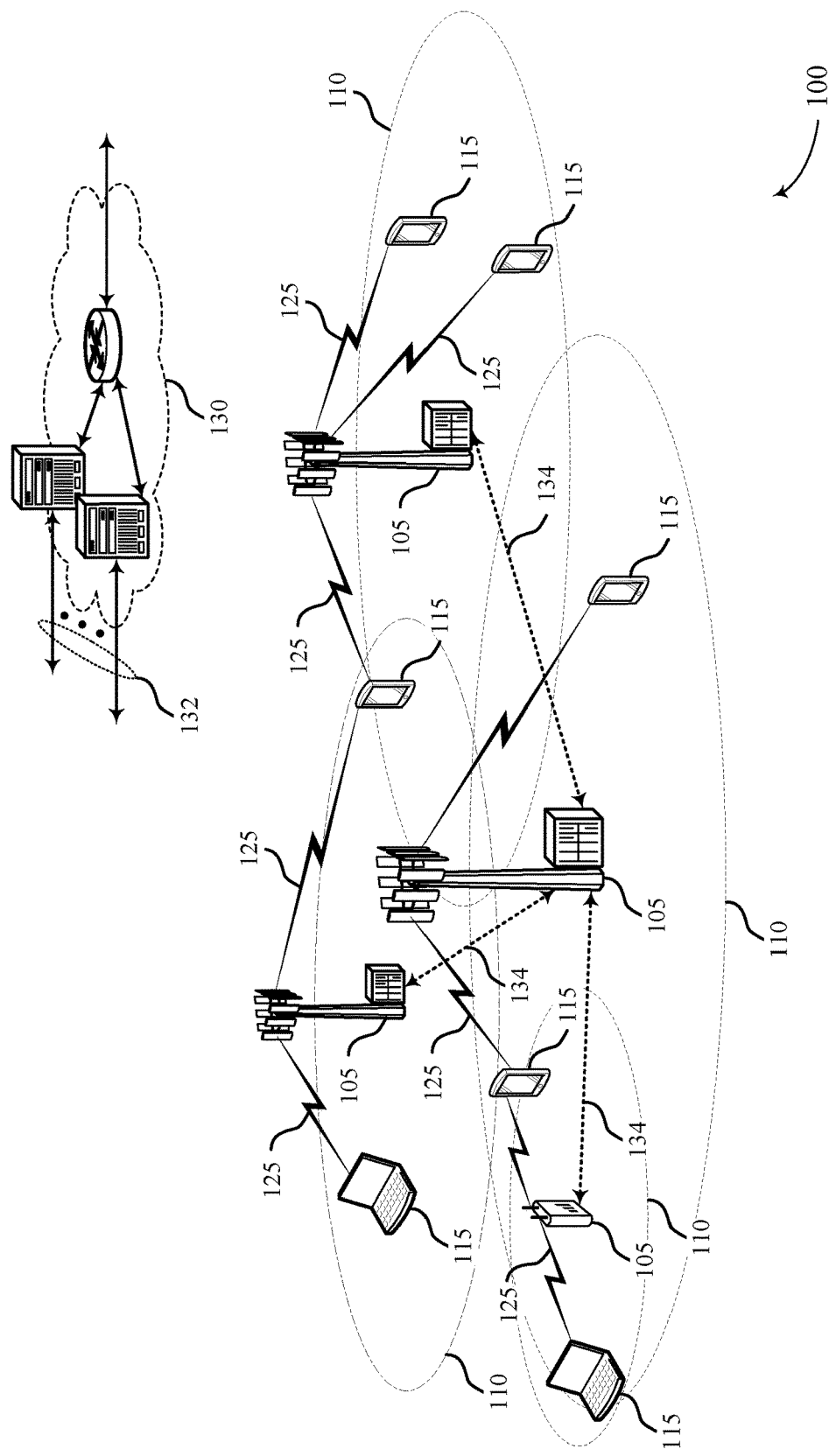
FIG. 1 illustrates an example of a system for wireless communication that supports synchronization signal design in accordance with aspects of the present disclosure.

In some wireless communications system, such as a New Radio (NR) system, certain resources may be periodically allocated for the transmission of synchronization signals and broadcast channels, which are used during cell acquisition. Resources for synchronization signals and broadcast channels may be multiplexed according to a Frequency Division Multiplexing (FDM) scheme or a Time Division Multiplexing (TDM) scheme. In FDM, two or more signals are transmitted concurrently using different frequencies (e.g., different sub-carriers). In TDM, two or more signals may be communicated using the same or different frequency but over different time periods (e.g., different symbol periods). In some TDM cases, a primary synchronization signal (PSS) and a secondary synchronization signal (SSS) may be transmitted in adjacent symbols using the same sub-carriers. For example, the PSS and the SSS may be transmitted periodically (e.g., every 5 milliseconds (ms)) and may be transmitted over adjacent symbols. Each set of resources may be referred to as a synchronization signal burst (SSBurst) or SSBurst set. Within a single SSBurst or SSBurst set, there may be multiple synchronization signal blocks (SSBlocks) which span multiple sub-carriers. In some examples, a PSS, an SSS, and one or more Physical Broadcast Channels (PBCHs) may be transmitted within each SSBlock and may be multiplexed according to a TDM scheme. In some cases, one or more demodulation reference signals (DMRS) may be transmitted within one or more PBCH symbols. The SSBurst or SSBurst set may be transmitted by a base station (e.g., periodically) to facilitate cell acquisition. In a New Radio system, for example, the SSBurst or SSBurst set may transmitted by a base station using a beamforming sweep pattern. During a beamforming transmission of the SSBurst, each SSBlock within the SSBurst or SSBurst set, may be transmitted in a different direction.

In some examples, a precoding relationship between a first synchronization signal (e.g., the PSS) and a second synchronization signal (e.g., the SSS) may be established and may be used during transmission of the PSS and SSS. The precoding relationship may be a shift in the phase between the PSS and the SSS or a precoding matrix applied across subcarriers and antenna ports for transmission of the PSS and the SSS. In some cases, the techniques described may apply to other examples of synchronization or reference signals. For instance, the first synchronization signal may be one of a primary synchronization signal or a secondary synchronization signal, and the second synchronization signal may be a DMRS signal. In some other cases, the first synchronization signal may be one of a first DMRS signal or a first beam reference signal, and the second synchronization signal may be one of a second DMRS signal or a second beam reference signal. According to some aspects, a UE receiving the PSS and SSS may determine a channel correlation between the PSS and SSS to determine various communication information, which may be used by the UE to enhance cell acquisition. For example, the communication information may indicate a physical channel timing parameter associated with the synchronization signals or broadcast channels such as a synchronization periodicity, a PBCH periodicity, a beam sweep periodicity, etc. In other examples, the communication information may include a physical channel presence indicator that indicates the presence of a PBCH transmission, a mobility reference signal (MRS) transmission, a beam or channel reference signal transmission, or combinations thereof. In some cases, the communication information may also include other timing parameters or system information, such as a cyclic prefix (CP) type, a cell identifier (ID), timing or frequency synchronization information, or other system information associated with the cell. In some cases, the precoding relationship or channel correlation between the PSS and SSS may convey opportunistic (e.g., non-essential or redundant) information to optimize UE receiver processing. For example, in some cases, an index of PBCH within a BCH TTI may be utilized by the UE to acquire system timing. In some cases, this information pertaining to PBCH timing may assist a UE in optimizing the number of PBCH blind decodes. In some other cases, the opportunistic information may be used to provide an indication of a physical channel timing parameter (e.g., relative position of SSS within a frame, BCH TTI boundaries including an index of the SSBurst set within PBCH TTI and/or a redundancy version of PBCH), an indication of synchronization modes (e.g., initial acquisition, RRC-idle mode, or RRC-connected mode), DMRS information (e.g., DMRS resources, DMRS configuration in PBCH), or a combination thereof. Furthermore, in some cases, the UE may not be able to determine the opportunistic information through the phase of the SSS. In such cases, the communication information may also be transmitted in other signals (e.g., a master information block (MIB) or system information block (SIB), etc.), or acquired through blindly checking multiple hypotheses while processing the other signals or channels.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE/LTE-A network, a millimeter wave (mmW) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one Mobile Management Entity (MME), at least one Serving Gateway (S-GW), and at least one Packet Data Network Gateway (P-GW). The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as a base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

Wireless communications system 100 may operate in an ultra-high frequency (UHF) frequency region using frequency bands from 700 MHz to 2600 MHz (2.6 GHz), although in some cases Wireless Local Area Network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 115) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station) and a receiver (e.g., a UE), where both the transmitter and receiver are equipped with multiple antennas. In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some aspects, a base station 105 may transmit at least one of a PSS, an SSS, a PBCH, a DMRS, or a beam reference signal, which may be used by a UE 115 during cell acquisition. The base station 105 may establish a precoding relationship between two or more of the PSS, SSS, PBCH, DMRS, or beam reference signal, which indicates communication information such as a physical channel timing parameter (e.g., indication of BCH TTI boundaries), a physical channel presence indicator, or a system information parameter. The system information parameter may be, for example, an indicator of an operation mode (e.g., initial acquisition, synchronization, or beam or mobility management, in an RRC-idle or RRC-connected mode) or DMRS configuration. A UE 115 may determine a channel estimation for the PSS, SSS, PBCH, or beam reference signal based on channel correlation(s) associated with the precoding relationship and may then use the determined channel estimation(s) to obtain various communication information. In some cases, the information conveyed through the phase of the SSS (e.g., by using PSS as a phase reference), may be opportunistic in nature. For example, in some cases, the SSS phase may carry information about PBCH timing, which in turn may assist a UE in reducing the number of PBCH blind decodes.

Figure 2:
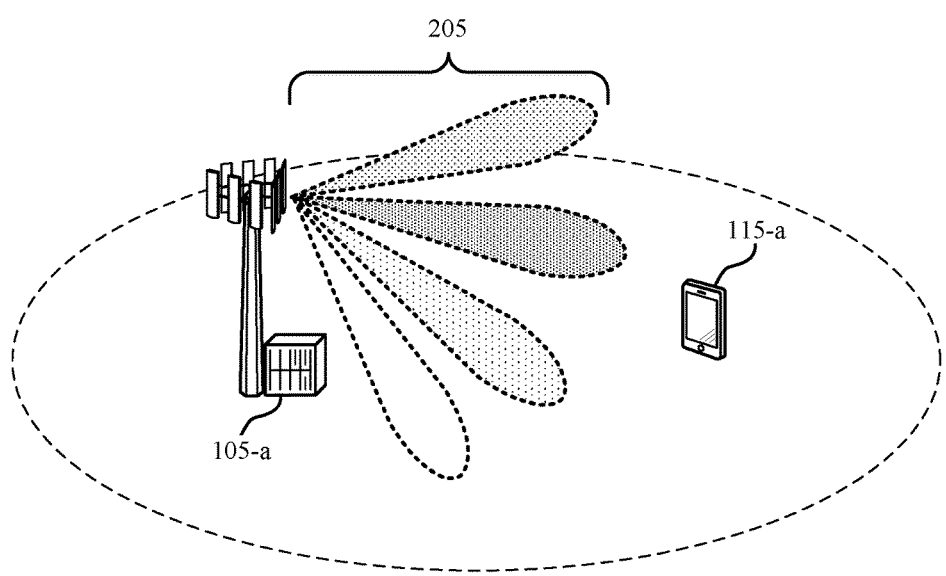
FIG. 2 illustrates an example of a wireless communications system that supports synchronization signal design in accordance with aspects of the present disclosure.

FIG. 2 illustrates an example of a wireless communication system 200 for synchronization signal design. Wireless communications system 200 may include base station 105-$a$ and UE 115-$a$, which may be examples of the corresponding devices described with reference to FIG. 1.

In wireless communication system 200, base station 105-$a$ may transmit a first synchronization signal and a second synchronization signal to UE 115-$a$ using beamforming. For instance, the base station 105-$a$ may transmit (e.g., radially) synchronization signal beams 205 in different directions. The synchronization signal beams 205 may each include an SSBlock of an SSBurst and may be transmitted periodically. Each of the synchronization signal beams 205 may correspond to a single SSBlock of an SSBurst such that each SSBlock of the SSBurst is transmitted in a different direction.

The SSBlock may span multiple tones or multiple resource blocks (RBs) over multiple symbols. In a TDM scheme, each of the multiple symbols may be allocated for transmission of either a PSS, an SSS, or a PBCH. In some instances, the base station 105-$a$ may identify communication information corresponding to a cell and based on the communication information, the base station 105-$a$ may establish a channel correlation between two or more signals of the SSBlock (e.g., the PSS and the SSS). In some examples, the channel correlation may be a phase shift between the PSS and the SSS and may be used to indicate the communication information. For instance, the base station 105-$a$ may transmit the SSBlock (and the corresponding PSS and SSS of the SSBlock) based on the channel correlation such that the PSS and SSS are transmitted having a phase shift with respect to each other.

In some cases, the phase shift or channel correlation between the PSS and SSS, or any other combination of synchronization signals (e.g., PSS and DMRS, or SSS and DMRS) may convey non-essential and/or opportunistic information to optimize UE receiver processing. For example, in some cases, an index of PBCH within a BCH TTI may be utilized by the UE to acquire system timing. In some cases, this information pertaining to PBCH timing may assist a UE in optimizing the number of PBCH blind decodes. In some other cases, the opportunistic information may be used to provide an indication of a physical channel timing parameter (e.g., relative position of SSS within a frame, BCH TTI boundaries including an index of the SSBurst set within PBCH TTI and/or a redundancy version of PBCH), an indication of synchronization modes (e.g., initial acquisition, RRC-idle mode, or RRC-connected mode), DMRS information (e.g., DMRS resources, DMRS configuration in PBCH), or a combination thereof. In some cases, the non-essential and/or opportunistic information may comprise 1 or 2 bits. Furthermore, in some cases, the opportunistic information may comprise a portion of the SS block index.

In some examples, the precoding relationship may be established by using a precoding matrix applied across multiple antenna ports and sub-carriers (e.g., SFBC) for transmission of the PSS, the SSS, and/or the DMRS. For instance, the UE 115-$a$ may receive the SSBlock transmitted by base station 105-$a$ and may determine a channel estimation of the SSS and the PSS over different sets of tones. Based on the channel estimation for the PSS and the SSS, the UE 115-$a$ may determine a channel estimation difference, which may be used to obtain or otherwise determine the precoding matrix used by the base station for transmitting the PSS or the SSS over the multiple antenna ports.

Figure 3:
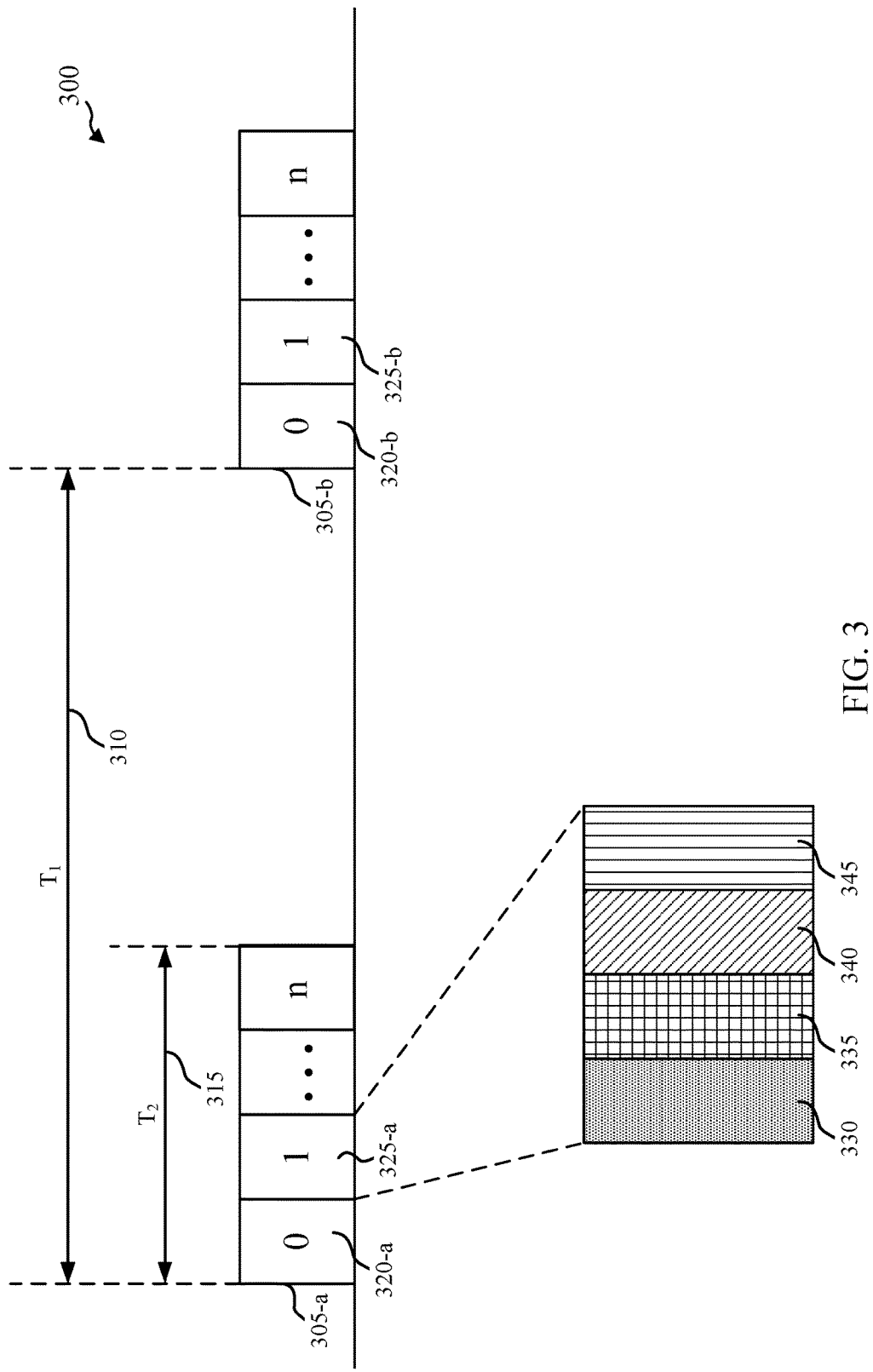
FIG. 3 illustrates an example of a frame structure that supports synchronization signal design in accordance with aspects of the present disclosure.

FIG. 3 illustrates an example of a frame structure 300 for synchronization signal design. In FIG. 3, an example of a first SSBurst or SSBurst set 305-$a$ and a second SSBurst or SSBurst set 305-$b$, that may be used for transmitting communication information is shown. In some cases, the first SSBurst 305-$a$ and the second SSBurst 305-$b$ may be similar in that transmission of the SSBursts 305-$a$ and 305-$b$ is periodic. In some cases, the first SSBurst 305-$a$ and the second SSBurst 305-$b$ represent aspects of techniques performed by a UE 115 or base station 105 as described with reference to FIGS. 1 and 2.

As shown in this example, resources are periodically allocated for the transmission of synchronization signals, which may be used by a UE (e.g., UE 115) during cell acquisition. For instance, synchronization signals may be allocated for transmission periodically every time period $T_1$ 310. The time period 310 may be predetermined by a base station (e.g., base station 105) and in some cases, $T_1$ may be 20 ms. Each SSBurst 305 spans a time duration $T_2$ 315 and in some examples, $T_2$ may be at most 5 ms.

Within one SSBurst 305, there may be multiple SSBlocks (0 through n). For instance, each SSBurst 305 may include a 0th SSBlock 320 and a 1st SSBlock 325. In some examples, each SSBlock may span multiple RBs (e.g., 6, 8, 10, 12, 14). Each RB may span multiple tones having a given tone spacing (e.g., 60 KHz, 120 KHz, 240 KHz, etc.). In some examples, each SSBlock may allocate resources for the transmission of multiple signals according to a TDM scheme. For instance, SSBlock 325-$a$ is shown allocating a first symbol for a broadcast channel 330 (e.g., a PBCH), a second symbol for a first synchronization signal 335 (e.g., PSS or SSS), a third symbol for a second synchronization signal 340 (e.g., a PSS or SSS), and fourth symbol for a second broadcast channel 345 (e.g., PBCH). Therefore, in some cases, a PSS, an SSS, and multiple PBCHs may be transmitted within SSBlock 325-*a*. In some cases, the PBCH may be wider in frequency domain than the PSS, the SSS, or both. For example, the PBCH may occupy 288 tones, whereas the PSS or SSS may occupy 127 tones. Furthermore, in some cases, the center frequency of all three may be aligned. In some cases, pilot tones (e.g., DMRS) may be transmitted at least in the frequency regions where PSS or SSS are not transmitted.

According to some aspects, there may be a maximum of 64 SSBlocks within each SSBurst (or SSBurst set) 305 and each SSBlock may be transmitted directionally using different transmission beams. Therefore, during the transmission of the SSBurst 305, each SSBlock is transmitted towards a different direction. The SSBurst may cover an angular range (e.g., 120 degrees, etc.) of a cell.

In some examples, the first synchronization signal 335 and the second synchronization signal 340 are transmitted back to back in adjacent symbols and a broadcast channel may be transmitted in the first and last symbols of the SSBlock. Thus, as the first synchronization signal 335 and the second synchronization signal 340 are surrounded by the first broadcast channel 330 and the second broadcast channel 345, a UE receiving the transmitted SSBlock may be able to detect a frequency offset between the first broadcast channel 330 and the second broadcast channel 345. For instance, a carrier frequency offset may be calculated using a phase difference between the first symbol and the fourth symbol of SSBlock 325-*a*.

In some wireless communication systems, the base station 105 may transmit multiple first synchronization signals 335 in different directions. The UE 115 may receive multiple spatially separated first synchronization signals 335 from different base stations 105. In some examples, the base station 105 may transmit multiple second synchronization signals 340 in different directions. The UE 115 may receive multiple spatially separated second synchronization signals 340 from different base stations 105. Therefore in some wireless communication systems, because of beam forming, the interference pattern on the first synchronization signal 335, observed by the UE 115, is similar to the interference pattern on the second synchronization signal 340. In other words, in wireless communication systems, a channel estimation for the first synchronization signal 335 is similar to a channel estimation for the second synchronization signal 340. A coherent detection of the second synchronization signal 340 based on the first synchronization signal 335 is therefore possible by the UE 115. In wireless communication systems, the base station 105 may transmit the first synchronization signal 335. In some examples, the base station 105 may configure the second synchronization signal 340 to transmit extra information through a precoding relationship of the second synchronization signal 340 with respect to the first synchronization signal. In this example, the first synchronization signal 335 may be a primary synchronization signal and the second synchronization signal 340 may be a secondary synchronization signal. In yet other examples, the locations of the primary synchronization signal and the secondary synchronization signal may be reversed. The UE 115 receiving the first synchronization signal 335 and the second synchronization signal 340 may be configured to decode the extra information by examining the precoding relationship between the first synchronization signal 335 and the second synchronization signal 340.

In some NR systems, although one or more neighboring synchronous cells may be configured to transmit the SSBlocks using the same resources, the SSBlocks are likely to be transmitted in different directions when each of the neighboring cells is transmitting using beamforming. Due to this spatial separation, the UE 115 receiving the first synchronization signal 335 and the second synchronization signal 340 may experience limited interference and if the signals are transmitted in adjacent or proximal symbols having relatively short symbol durations (e.g., ~4.5 μs), the first synchronization signal 335 and the second synchronization signal 340 may experience similar effects from, for example, carrier frequency offset, phase noise, Doppler shift, etc. (i.e., may experience similar channels). Thus, in some cases, the channel observed and estimated for the first synchronization signal 335 may be used to equalize the channel observed for the second synchronization signal 340.

In one example, a phase shift between the first synchronization signal 335 and the second synchronization signal 340 may be introduced in a single-layer transmission. In some examples, a base station 105 may transmit the first synchronization signal 335 and the second synchronization signal 340 on all ports without precoding (i.e., the same symbol is transmitted from each port of the base station 105). In such a case, a first sequence associated with the first synchronization signal 335 may be defined as $b(0, \ldots, N-1)$, where N represents the number of tones used for transmission of the first synchronization signal 335 and $b(0)$ is the 0th tone of the first synchronization signal 335. The first synchronization signal 335 may be transmitted from port i of a base station antenna and if the first synchronization signal 335 is a PSS, it may be represented as $x_i^{pss}(n) = b(n)$, where n is the tone used for transmission. As the first synchronization signal 335 transmitted from port i undergoes a channel (represented by $H_i(n)$), the received signal (e.g., received by a UE 115) may be represented as $y_{pss}(n)$ using the following equation:

$$y_{pss}(n) = H_{pss}(n)b(n) + w_1(n),$$

where $H_{pss}(n) = H_0(n) + \ldots + H_{P-1}(n)$, P is the number of ports and $w_1(n)$ is noise.

The second synchronization signal 340 may be defined as $d(0, \ldots, N-1)$, where N represents the number of tones used for transmission of the second signal $d(0)$ is the 0th tone of the second synchronization signal 340. In this example, the second synchronization signal 340 may be an SSS and transmitted from port i of a base station antenna, and thus may be represented as $x_i^{sss}(n) = d(n)$, where n is the tone used for transmission. As the second synchronization signal 340 undergoes a channel (represented by $H_i(n)$), the received signal (e.g., received by a UE 115) may be represented by $y_{sss}(n)$ using the following equation:

$$y_{sss}(n) = H_{sss}(n)d(n) + w_2(n),$$

where $H_{sss}(n) = H_0(n) + \ldots + H_{P-1}(n)$, P is the number of ports and $w_2(n)$ is noise. We note that, as mentioned above, the channels, observed on a port p and tone n, in the PSS and SSS symbols are expected to be similar, and hence it is denoted by $H_p(n)$ for both PSS and SSS.

To illustrate 1-bit of information carried through the phase of the second synchronization signal 340, the transmitted second synchronization signal 340 may include either a base sequence represented by $d(0, \ldots, N-1)$ or a π shifted base sequence represented by $-d(0, \ldots, N-1)$. Thus, if $H_{pss}(n) = H_{sss}(n) := H(n)$, the received second synchronization signal for base sequence d may be represented using the following equation:

$$y_{sss}(n) = H(n)d(n) + w_2(n)$$

and the received second synchronization signal for base sequence −d (i.e., with π shift) may be represented using the following equation:

$$y_{sss}(n) = -H(n)d(n) + w_2(n)$$

After receiving the second synchronization signal 340, the channel H(n) may be estimated using the received first synchronization signal 335 with base sequence b (i.e., PSS (b)) by comparing it with the channel estimated using the second synchronization signal 340 with base sequence d (i.e., SSS(d)). In one example, if the phase between the PSS(b) and the SSS(d) observed by the UE 115 is approximately zero, then the UE 115 may be able to determine that d was transmitted by the base station 105, while if the phase between PSS(b) and SSS(d) observed by the UE 115 is about π, then the UE 115 may be able to determine that −d was transmitted by the base station 105. Based on this phase shift, a UE 115 may be able to determine various communication information.

In some cases, the PSS and SSS may be transmitted on the same antenna port, which may allow for coherent detection of SSS by using PSS as a phase reference. Furthermore, in some cases, 1 or 2 bits of information may be transmitted through the phase of the SSS signal, for example, opportunistic (e.g., non-essential or redundant) information to optimize UE receiver processing. For example, in some cases, reliability acquiring the 1 or 2 bits of information may serve to decrease or optimize complexity associated with receiving subsequent signals or channels, while system acquisition does not depend on acquiring the information.

In some cases, the opportunistic information may be utilized to provide an indication of a PBCH index within a BCH TTI. For example, in some cases, the transmission periodicity of PBCH for initial acquisition may be 20 ms, and the BCH TTI may be a duration of 80 ms. Thus, a UE may need some indication of an index of PBCH within a BCH TTI to acquire system timing. In such cases, the opportunistic information carried via the phase of the SSS may assist a UE in optimizing the number of PBCH blind decodes, in order to acquire system timing. In some other cases, the UE may blindly decode multiple redundancy versions of NR-PBCH to acquire system timing. Alternatively, in some cases, the UE may not reliably decode or receive the 1 or 2 bit information through the phase of the SSS. In such cases, since the 1 or 2 bit information is opportunistic in nature, the UE may acquire the PBCH index through other means, such as through the MIB or SIB. Furthermore, in such cases, the UE may need to check multiple hypotheses when combining two or more PBCH channels across SSBurst sets.

In some other cases, the opportunistic information may be used to provide an indication of a physical channel timing parameter (e.g., relative position of SSS within a frame, BCH TTI boundaries including an index of the SSBurst set within PBCH TTI and/or a redundancy version of PBCH), an indication of synchronization modes (e.g., initial acquisition, RRC-idle mode, or RRC-connected mode), DMRS information (e.g., DMRS resources, DMRS configuration in PBCH), or a combination thereof. In some cases, synchronization mode for UEs may vary (e.g., in periodicity) based in part on the UE status, for example, idle or RRC connected mode. In some cases, the SFN may comprise a plurality of bits (e.g., 10 bits). Furthermore, a portion of those bits (e.g., 8 bits) may explicitly be a part of MIB, and the remainder (e.g., 2 bits) may be conveyed (e.g., implicitly) through PBCH. Thus, in some cases, a UE may utilize the 1 or 2 bit opportunistic information to decode the PBCH or determine the LSBs of the SFN, following which processing or decoding for the SFN may be optimized.

Figure 4A:
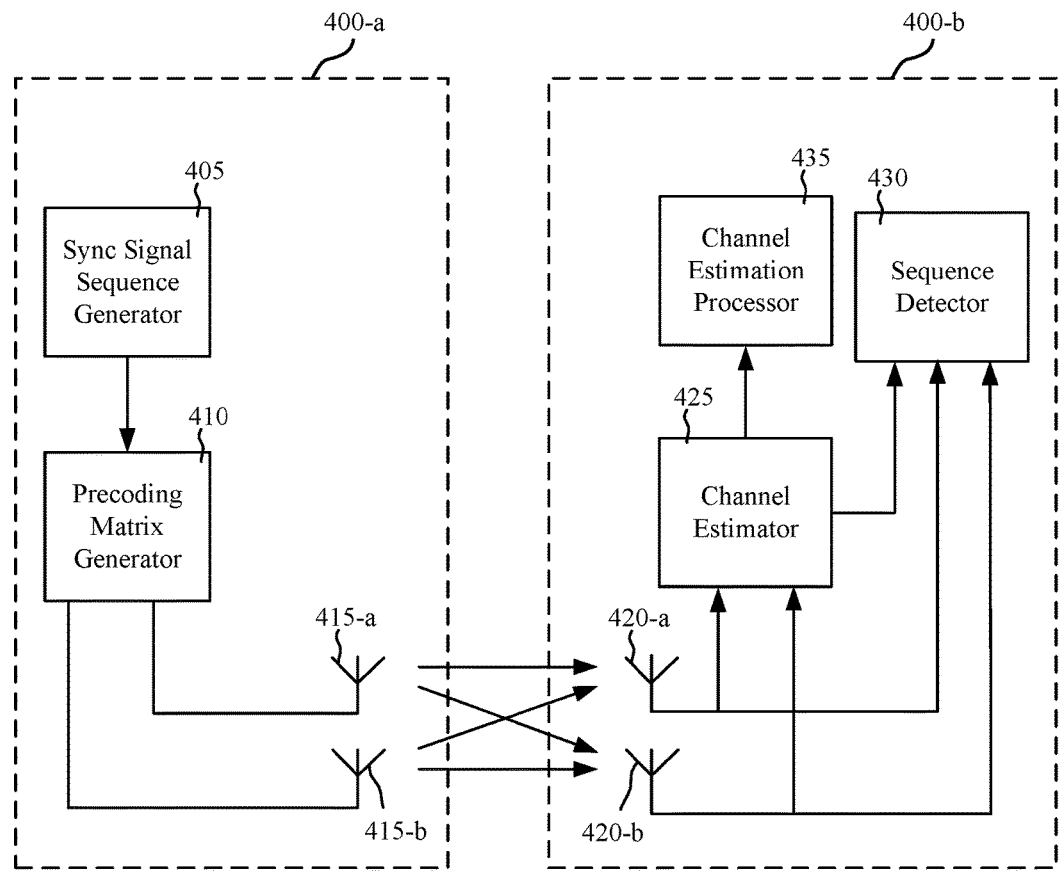
FIGS. 4A and 4B illustrate an example communication between a transmitter and receiver that support synchronization signal design in accordance with aspects of the present disclosure.
Figure 4B:
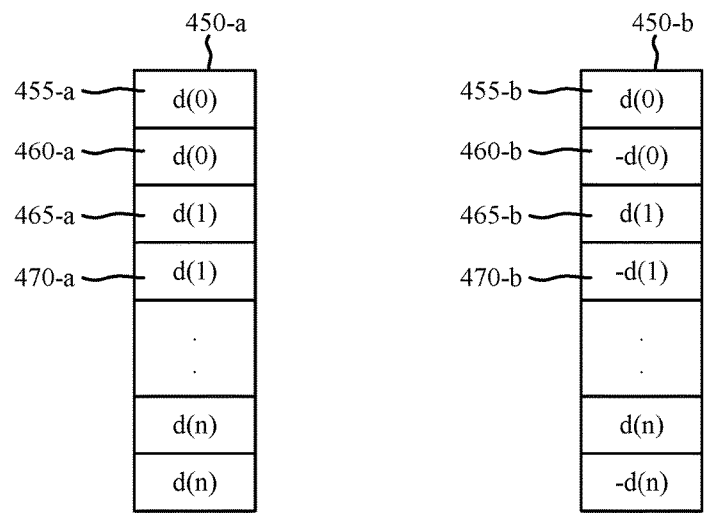

FIGS. 4A and 4B illustrate example communications of a communications system including a transmitter 400-a and a receiver 400-b that support synchronization signal design. In some cases, the transmitter 400-a and the receiver 400-b may represent aspects of techniques performed by a base station 105 or a UE 115 as described with reference to FIGS. 1-3. As shown, transmitter 400-a includes a sync signal sequence generator 405, a precoding matrix generator 410, a first antenna port 415-a, and a second antenna port 415-b. The receiver 400-b includes a first antenna port 420-a, a second antenna port 420-b, a channel estimator 425, a sequence detector 430, and a channel estimation processor 435. Each of the antenna ports 415 or 420 may be mapped to one or more antennas of the transmitter 400-a or receiver 400-b.

The sync signal sequence generator 405 may be used to generate a first synchronization signal and a second synchronization signal. In some examples, the first synchronization signal may be a PSS and the second synchronization signal may be an SSS. Once the first and second synchronization signals are generated, symbols associated with the first synchronization signal are mapped to antenna ports 415-a and 415-b. Similarly, the symbols associated with the second synchronization signal are also mapped to antenna ports 415-a and 415-b.

To map the symbols to the antenna ports 415, a precoding matrix generated by the precoding matrix generator 410 may be used. The precoding matrix generator 410 may generate a different precoding matrix to map the symbols of the first and second synchronization signals for transmission by the antenna ports 415-a and 415-b. In some examples, a subset of tones used for transmission of the first synchronization signal and second synchronization signal may be configured to be transmitted using the same combined channel from the antenna ports 415 of the transmitter 400-a. For instance, the precoding matrix may be used to map a synchronization signal to even tones. In some examples, the precoding matrix may be used to map a synchronization signal to the odd tones using a phase shift. Further, the choice of a second precoding matrix for the second synchronization signal 340, when different from the first precoding matrix for the first synchronization signal 335, may carry communication information.

For example, a 2 layer transmission in which transmitter 400-a has two antenna ports 415-a and 415-b and receiver 400-b has two antenna ports 420-a and 420-b. In some examples, the precoding matrix generator 410 may determine a precoding matrix for transmission of the first synchronization signal 335 and the second synchronization signal 340. The choice of the precoding matrix may indicate additional communication information, which may be used by the receiver 400-b to obtain the additional communication information to be used for cell acquisition, communication, or the like.

In one example, the channels for the first synchronization signal and the second synchronization signal observed by receiver 400-b may be the same for even tones and different for odd tones. For instance, the first synchronization signal may be transmitted from all antenna ports 415 without precoding. Thus, the channel estimate equation for transmission of the first synchronization signal using antenna ports 415 may be defined as:

$$H_{pss}(n) = H_0(n) + H_1(n).$$

Referring now to FIG. 4B, in some examples, the SSS may be transmitted from first and second antenna ports of the transmitter 400-*a*. As shown, transmitter 400-*a* includes a first set of antenna ports 415-*a* and a second set of antenna ports 415-*b*. For even tones, the channel estimate for received SSS is the summation between $H_0$ and $H_1$. The channel estimate for SSS signals for even ports is described in the following equation:

$$H_{sss}(2n)=H_0(2n)+H_1(2n)$$

And, for odd tones, the received SSS signal is the difference between $H_0$ and $H_1$. The channel estimate for SSS signals for odd ports is described in the following equation:

$$H_{sss}(2n+1)=H_0(2n+1)-H_1(2n+1)$$

Therefore, when the UE 115 compares the channel between the PSS and the SSS on even tones, it expects to detect that the channel for the PSS is same as the channel for the SSS. When the UE 115 compares the channel between the PSS and the SSS on odd tones, it expects to detect that the channel for the PSS is different than the channel for the SSS. That is, the channel estimate for the PSS is the same (e.g., approximately equal) as the channel estimate for the SSS on even tones and the channel estimate for the PSS is different than the channel estimate for the SSS on odd tones. This may further be described using the following equations:

$$H_{pss}(2n)=H_{sss}(2n)$$

$$H_{pss}(2n+1) \neq H_{sss}(2n+1)$$

In some examples, the SSS may be transmitted with a precoding matrix over even and odd tones. The SSS base sequence may be described as d and the SSS base sequence may be transmitted from 0th tone to (N−1)th tone, where N describes the total number of tones occupied by an SSBlock. The base sequence for the SSS may be described as $$d\left(0, \ldots, \frac{N}{2}-1\right).$$

The SSS base sequence d may be transmitted using a precoding matrix $\mathcal{P}$. In one example, the rows of the precoding matrix $\mathcal{P}$ may represent tones and the columns of the precoding matrix $\mathcal{P}$ may represent antenna ports. The precoding matrix $\mathcal{P}$ may be described as $$\mathcal{P} = \begin{bmatrix} 1 & 1 \\ 1 & -1 \end{bmatrix}.$$

In an example where the antenna port is 0 (i.e., even), the SSS base sequence may be $$\begin{bmatrix} 1 \\ 1 \end{bmatrix} d(n)$$

and represented by the following equation.

$$\begin{bmatrix} x_0^{sss}(2n) \\ x_0^{sss}(2n+1) \end{bmatrix} = \begin{bmatrix} 1 \\ 1 \end{bmatrix} d(n)$$

Where the antenna port is 1 (i.e., odd), the SSS base sequence may be $$\begin{bmatrix} 1 \\ -1 \end{bmatrix} d(n)$$

and represented by the following equation.

$$\begin{bmatrix} x_1^{sss}(2n) \\ x_1^{sss}(2n+1) \end{bmatrix} = \begin{bmatrix} 1 \\ -1 \end{bmatrix} d(n)$$

Based on the above, the SSS base sequence d transmitted from the 0th tone on an even port and the 1st tone on an even port may be d(0) shown by 455-*a* and 460-*a*. The SSS base sequence d transmitted from the 0th tone on an odd port may be d(0) 455-*b*, while the SSS base sequence d transmitted from the 1st tone on an odd port, may be −d(0) 460-*b*.

Further, the SSS base sequence d transmitted from the 2nd tone on an even port and the 3rd tone on an even port may be d(1) shown by 465-*a* and 470-*a*. The SSS base sequence d transmitted from the 2nd tone on an odd port may be d(1) 465-*b*, while the SSS base sequence d transmitted from the 3rd tone on an odd port, may be −d(1) 470-*b*. By comparing the base sequence received on sets of sub-carriers for a given port, the receiver 400-*b* may determine a correlation between the SSS and the PSS and obtain additional communication information.

In some examples, the SSS base sequence may be received by the receiver 400-*b* either from antenna port 0 or from antenna port 1. The received SSS signal may be calculated using the following equation:

$$\begin{bmatrix} y_{sss}(2n) \\ y_{sss}(2n+1) \end{bmatrix} = \begin{bmatrix} H_0(2n) + H_1(2n) \\ H_0(2n+1) - H_1(2n+1) \end{bmatrix} d(n)$$

In some examples, the receiver 400-*b* may be configured to determine the precoding matrix using the received PSS and the received SSS. In this example, the transmitter 400-*a* may send 1 bit of information through the phase of the second synchronization signal by selecting a precoding matrix from one of the following:

$$\mathcal{P}_1 = \begin{bmatrix} 1 & 1 \\ 1 & -1 \end{bmatrix} \text{ and } \mathcal{P}_2 = \begin{bmatrix} -1 & -1 \\ -1 & 1 \end{bmatrix}$$

where the rows in each of the precoding matrices map to different tones and the columns map to different antenna ports.

The receiver 400-*b* may determine the precoding matrix used for transmission and therefore obtain the 1 bit of information by comparing the channel estimate for the received first synchronization signal and the channel estimate for the received second synchronization signal on even tones. The channel estimates may be determined by the channel estimator and using the channel estimates, the channel estimation processor may determine the addition information using the following:

If $H_{pss}(2n) \approx H_{sss}(2n)$, then $\mathcal{P}_1$ was used

If $H_{pss}(2n) \approx -H_{sss}(2n)$, then $\mathcal{P}_2$ was used

For instance, if the channel estimate for the received first synchronization signal is the same as the channel estimate for the received second synchronization signal, then the receiver 400-*b* may determine that $\mathcal{P}_1$ was used as the precoding matrix. If the channel estimate for the received first synchronization signal is shifted by 180 degrees (i.e., inverted or phase shifted by π) when compared to the channel estimate for the received second synchronization signal, then the receiver 400-*b* may determine that $\mathcal{P}_2$ was used as the precoding matrix.

In another example, the transmitter 400-*a* may be configured to send 2 bits of information to the receiver 400-*b*. The transmitter 400-*a* may send 1 bit of information through the phase of the second synchronization signal and another bit of information through swapping a port mapping using the precoding matrix. In some examples, the transmitter 400-*a* may have multiple choices for a precoding matrix, which may be different based on the port mapping. In one example, swapping the port mapping may involve generating a precoding matrix by using different phase relationships between antenna ports on various sets of tones. For instance, example precoding matrices are as follows:

$$\mathcal{P}_1 = \begin{bmatrix} 1 & 1 \\ a_1 & -a_1 \end{bmatrix},$$

$$\mathcal{P}_2 = \begin{bmatrix} a_2 & -a_2 \\ 1 & 1 \end{bmatrix},$$

$$\mathcal{P}_3 = \begin{bmatrix} -1 & -1 \\ a_3 & -a_3 \end{bmatrix},$$

$$\mathcal{P}_4 = \begin{bmatrix} a_4 & -a_4 \\ -1 & -1 \end{bmatrix},$$

where $a_i \in \{1, -1\}$

The receiver 400-*b* may identify the precoding matrix by comparing the channel estimate of the first synchronization signal (e.g., PSS) over even tones with the channel estimate of the second synchronization signal (e.g., SSS) over even tones and the channel estimate of the first synchronization signal over odd tones with the channel estimate of the second synchronization signal over odd tones. In one example, the comparison is performed by the receiver 400-*b* by comparing:

$$\begin{bmatrix} H_{pss}(2n) \\ H_{pss}(2n+1) \end{bmatrix} \text{ and } \begin{bmatrix} H_{sss}(2n) \\ H_{sss}(2n+1) \end{bmatrix} \text{ (for all } n\text{)}$$

Over even and odd tones, the channel estimation for the first synchronization signal (e.g., PSS) may be calculated as a sum-channel and represented by the following equation:

$$H_{pss}(n) = H_0(n) + H_1(n)$$

During half of the tones, the channel estimation for the second synchronization signal (e.g., SSS) may be calculated as a delta-channel and represented by the following equation:

$$H_{sss}(n) = \pm(H_0(n) - H_1(n))$$

The channel estimation for the PSS and the channel estimation for the SSS are expected to match with 0 or π phase shift on half of the tones, and be different on the other half of the tones as represented by the following equations:

If $H_{pss}(2n) \approx H_{sss}(2n)$ and $H_{pss}(2n+1) \neq \pm H_{sss}(2n+1) \rightarrow$
$\mathcal{P}_1$ If $H_{pss}(2n+1) \approx H_{sss}(2n+1)$ and $H_{pss}(2n) \neq \pm H_{sss}(2n) \rightarrow$
$\mathcal{P}_2$ If $H_{pss}(2n) \approx -H_{sss}(2n)$ and $H_{pss}(2n+1) \neq \pm H_{sss}(2n+1) \rightarrow$
$\mathcal{P}_3$ If $H_{pss}(2n+1) \approx -H_{sss}(2n+1)$ and $H_{pss}(2n) \neq \pm H_{sss}(2n) \rightarrow$
$\mathcal{P}_4$ For example, if the channel estimation for the PSS is equal to the channel estimation for the SSS on even tones, and the channel estimation for the PSS is not equal to the channel estimation for the SSS with 0 or π phase shift on odd tones, then the receiver 400-*b* may determine that the precoding matrix used for transmission processing was $\mathcal{P}_1$. In another example, if the channel estimation for the PSS is equal to the channel estimation for the SSS on odd tones, and the channel estimation for the PSS is not equal to the channel estimation for the SSS with 0 or π phase shift on even tones, then the receiver 400-*b* may be able to calculate the precoding matrix as $\mathcal{P}_2$. In another example, if the channel estimation for the PSS is equal to the negative of the channel estimation for the SSS on even tones, and the channel estimation for the PSS is not equal to the channel estimation for the SSS with 0 or π phase shift on odd tones, then the receiver 400-*b* may be able to calculate the precoding matrix as $\mathcal{P}_3$. In another example, if the channel estimation for the PSS is equal to the negative of the channel estimation for the SSS on odd tones, and the channel estimation for the PSS is not equal to the channel estimation for the SSS with 0 or π phase shift on even tones, then the receiver 400-*b* may be able to calculate the precoding matrix as $\mathcal{P}_4$.

In some examples, the second synchronization signal (e.g., SSS) may also be used for channel estimation of another signal such as a PBCH. For instance, the precoding matrix used during transmission of the SSS may determine the precoding matrix used during transmission of the PBCH. In some examples, during port swapping for the SSS, the transmitter 400-*a* may generate a precoding matrix by swapping the rows for even tones with the rows for odd tones and thus, the transmission of the PBCH may also be based on the precoding matrix swapping the even tones with the odd tones. Further, the SSS may be a pilot signal for a PBCH.

In some examples, for PBCH, a Space-Frequency Block-Code (SFBC) matrix may be generated by transmitter 400-*a* (e.g., using the precoding matrix generator 410) for a particular precoding matrix $\mathcal{P}$, which may be represented by the following precoding matrix $\mathcal{P}$ and PBCH SFBC matrix M:

$$\mathcal{P} = \begin{bmatrix} 1 & 1 \\ 1 & -1 \end{bmatrix},$$

$$\text{PBCH SFBC } M = \begin{bmatrix} c_1 & -c_2^* \\ c_2 & c_1^* \end{bmatrix}$$

In some examples, the receiver 400-*b* receives PBCH samples on two consecutive tones and the PBCH samples for even tones and odd tones may be calculated using the following equation:

$$\begin{bmatrix} y_{pbch}(2n) \\ y^*_{pbch}(2n+1) \end{bmatrix} = \begin{bmatrix} H_1 & -H_2 \\ H_2^* & H_1^* \end{bmatrix} \begin{bmatrix} c_1 \\ c_2^* \end{bmatrix}$$

The channel estimation for the SSS may be calculated by the using channel estimator 425 using the following equation:

$$\begin{bmatrix} H_{sss}(2n) \\ H_{sss}(2n+1) \end{bmatrix} = \begin{bmatrix} H_1 + H_2 \\ H_1 - H_2 \end{bmatrix}$$

An algorithm for estimating a channel at the receiver 400-b may be based on the channel estimation for the SSS over even tones and the channel estimation for the SSS over odd tones. The receiver algorithm for channel estimation may be described using the following equation:

$$\tilde{H}_1 = \frac{(H_{sss}(2n) + H_{sss}(2n+1))}{2} \text{ and } \tilde{H}_2 = \frac{(H_{sss}(2n) - H_{sss}(2n+1))}{2}$$

An algorithm for PBCH processing at the receiver 400-b may be based on the channel estimates and the received PBCH over even tones and the channel estimates and the received PBCH over odd tones. The SFBC matrix M may be calculated using the PBCH processing algorithm using the following equation:

$$\begin{bmatrix} \tilde{c}_1 \\ \tilde{c}_2^* \end{bmatrix} \leftarrow \frac{1}{|\tilde{H}_1|^2 + |\tilde{H}_2|^2} \left( \begin{bmatrix} \tilde{H}_1 & -\tilde{H}_2 \\ \tilde{H}_2^* & \tilde{H}_1^* \end{bmatrix} \right)^H \begin{bmatrix} y_{pbch}(2n) \\ y^*_{pbch}(2n+1) \end{bmatrix}$$

In some examples, transmitter 400-a may change a precoding matrix $$\mathcal{P} = \begin{bmatrix} 1 & 1 \\ 1 & -1 \end{bmatrix}$$

to another precoding matrix $$\mathcal{P}_4 = \begin{bmatrix} 1 & -1 \\ -1 & -1 \end{bmatrix}.$$

In some examples, precoding matrix $$\mathcal{P}_4 = \begin{bmatrix} 1 & -1 \\ -1 & -1 \end{bmatrix}$$

is chosen by swapping two ports and performing π rotation over the $2^{nd}$ port. If the precoding matrix is chosen to be $\mathcal{P}_4$, then PBCH SFBC matrix correspondingly changes to $$M_4 = \begin{bmatrix} -c_2^* & -c_1 \\ c_1^* & -c_2 \end{bmatrix}$$

from $$M_1 = \begin{bmatrix} c_1 & -c_2^* \\ c_2 & -c_1^* \end{bmatrix}$$

by swapping two ports and performing π rotation over the $2^{nd}$ port. The receiver 400-b may receive PBCH samples on two consecutive tones. The calculation of received PBCH over even tones and odd tones may be based on following equation:

$$\begin{bmatrix} y_{pbch}(2n) \\ y^*_{pbch}(2n+1) \end{bmatrix} = \begin{bmatrix} -H_1 & -H_2 \\ -H_2^* & H_1^* \end{bmatrix} \begin{bmatrix} c_2^* \\ c_1 \end{bmatrix}$$

During even tones, the receiver 400-b may receive SSS using $H_1$–$H_2$. During odd tones, the receiver 400-b may receive SSS using –$H_1$–$H_2$. The calculation of the received SSS over even tones and odd tones is described in more details in the following equation:

$$\begin{bmatrix} H_{sss}(2n) \\ H_{sss}(2n+1) \end{bmatrix} = \begin{bmatrix} H_1 - H_2 \\ -H_1 - H_2 \end{bmatrix}$$

The algorithm for estimating the channel at the receiver 400-b may be based on the channel estimation for the SSS over even tones and the channel estimation for the SSS over odd tones. Using the receiver algorithm, the UE 115 may determine the value of $\tilde{H}_1$ as –$H_2$ and the value of $\tilde{H}_2$ as $H_1$. The receiver algorithm for channel estimation may be described using the following equation:

$$\tilde{H}_1 = \frac{(H_{sss}(2n) + H_{sss}(2n+1))}{2} = -H_2 \text{ and}$$

$$\tilde{H}_2 = \frac{(H_{sss}(2n) + H_{sss}(2n+1))}{2} = H_1$$

In another example, the algorithm for PBCH processing at the receiver 400-b may be based on the channel estimates and the received PBCH over even tones and the channel estimates and the received PBCH over odd tones. The SFBC matrix M may be calculated using the PBCH processing algorithm. The following example describes calculating the value of the SFBC matrix M using the PBCH processing algorithm for channel estimation using the following equation:

$$\begin{bmatrix} \tilde{c}_1 \\ \tilde{c}_2^* \end{bmatrix} \leftarrow \frac{1}{|\tilde{H}_1|^2 + |\tilde{H}_2|^2} \left( \begin{bmatrix} \tilde{H}_1 & -\tilde{H}_2 \\ \tilde{H}_2^* & \tilde{H}_1^* \end{bmatrix} \right)^H \begin{bmatrix} y_{pbch}(2n) \\ y^*_{pbch}(2n+1) \end{bmatrix} =$$

$$\frac{1}{|H_1|^2 + |H_2|^2} \left( \begin{bmatrix} -H_2 & -H_1 \\ H_1^* & H_2^* \end{bmatrix} \right)^H \begin{bmatrix} -H_1 & -H_2 \\ -H_2^* & H_1^* \end{bmatrix} \begin{bmatrix} c_2^* \\ c_1 \end{bmatrix} =$$

$$\frac{1}{|H_1|^2 + |H_2|^2} \begin{bmatrix} -H_2^* & H_1 \\ -H_1^* & -H_2 \end{bmatrix} \begin{bmatrix} -H_1 & -H_2 \\ -H_2^* & H_1^* \end{bmatrix} \begin{bmatrix} c_2^* \\ c_1 \end{bmatrix} = \begin{bmatrix} 0 & 1 \\ 1 & 0 \end{bmatrix} \begin{bmatrix} c_2^* \\ c_1 \end{bmatrix} = \begin{bmatrix} c_1 \\ c_2^* \end{bmatrix}$$

Thus, based on the above, regardless of the precoding matrix used for transmission by the transmitter 400-a, the receiver 400-b may be capable of receiving the correct samples.

Figure 5:
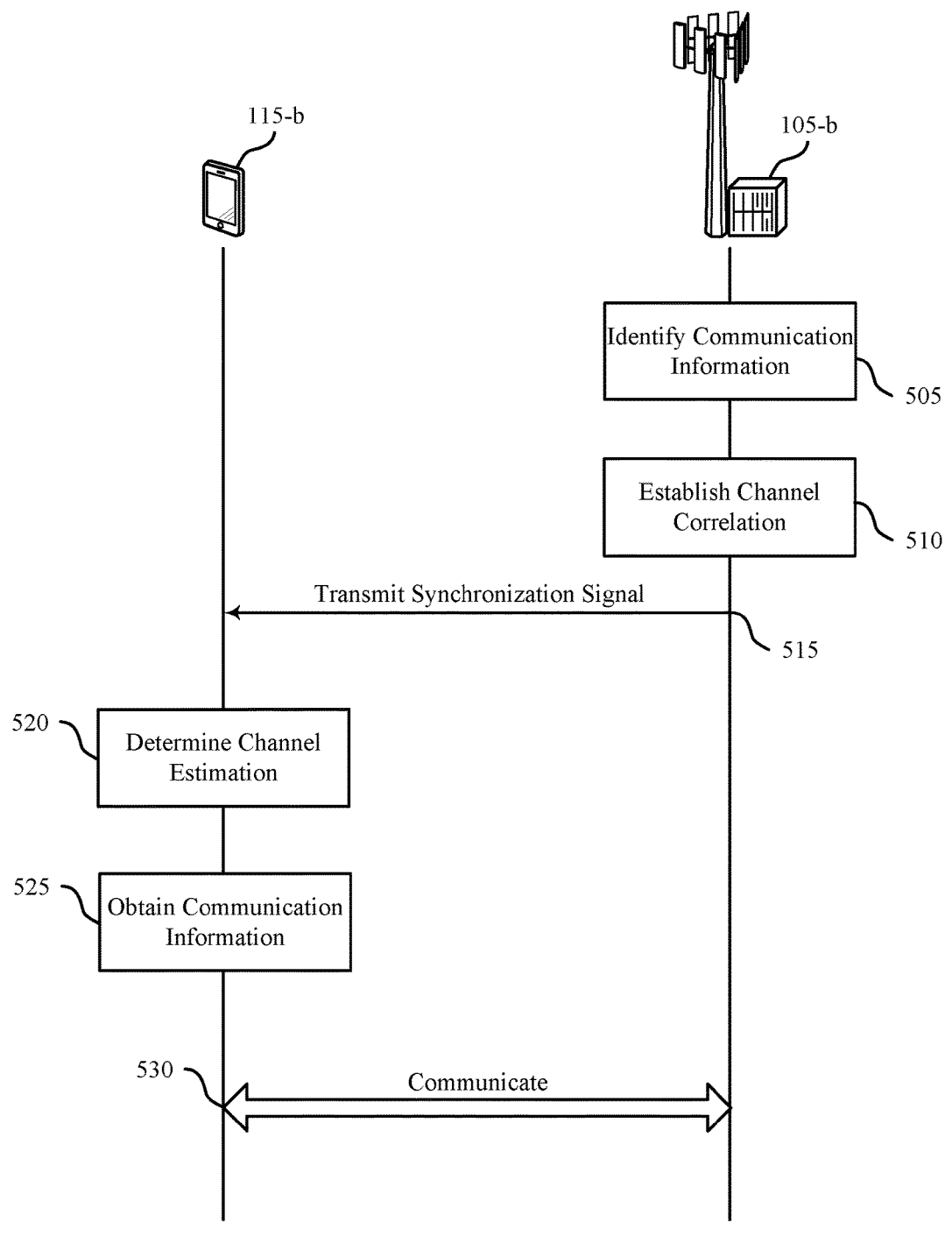
FIG. 5 illustrates an example of a process flow that supports synchronization signal design in accordance with aspects of the present disclosure.

FIG. 5 illustrates an example of a process flow 500 for synchronization signal design. Process flow 500 may include base station 105-*a* and UE 115-*a*, which may be examples of the corresponding devices described with reference to FIGS. 1 and 2.

At 505, base station 105-*b* may identify communication information associated with a cell. The identified communication information may indicate a physical channel timing parameter such as a synchronization periodicity or a PBCH periodicity (e.g., relative position of SSS within a frame, a redundancy version of PBCH), a beam sweep periodicity (e.g., an index of the SSBurst set within PBCH TTI), a CP type, etc. In some examples, the communication information may include a physical channel presence indicator that indicates the presence of a PBCH transmission, an MRS transmission, a beam or channel reference signal transmission, or combinations thereof. In some cases, the communication information may additionally or alternatively include a system information parameter, which may correspond to a cell ID, timing or frequency synchronization information, or other system information associated with the cell. For example, the system information parameter may be an indicator of an operation mode (e.g., initial acquisition, synchronization, or beam or mobility management, in an RRC-idle or RRC-connected mode) or DMRS configuration.

At 510, base station 105-*b* may establish a precoding relationship between a first synchronization signal (e.g., a PSS, a SSS, a DMRS, or a beam reference signal) and a second synchronization signal (e.g., a PSS, a SSS, a DMRS, or a beam reference signal). The precoding relationship may indicate or convey the communication information identified at 505. In some examples, establishing the precoding relationship may include introducing a phase shift between the first synchronization signal and the second synchronization signal. The precoding relationship may additionally or alternatively indicate a precoding matrix for transmission of the first synchronization signal and/or the second synchronization signal.

At 515, base station 105-*b* may transmit at least one of the first synchronization signal and the second synchronization signal. The transmission may be performed based on the precoding relationship. For instance, the first synchronization signal may be transmitted having a phase shift with respect to the second synchronization signal. In some examples, the first and second synchronization signals may be transmitted using different precoding matrices. The first synchronization signal may be transmitted during a first set of resources (e.g., a first set of subcarriers, a first symbol period, or both) and the second synchronization signal may be transmitted during a second set of resources (e.g., a second set of subcarriers, a second symbol period, or both). In some examples, the base station 105-*b* may transmit an SSBurst or SSBurst set that may include a plurality of SSBlocks. Different beamforming coefficients may be used to transmit the plurality of SSBlocks.

At 520, based on the transmitted synchronization signals, the UE 115-*b* may determine a first channel estimation for the first synchronization signal and a second channel estimation for the second synchronization signal. The channel estimation may be used to determine a channel correlation between the first synchronization signal and the second synchronization signal. In some instances, the channel estimation may be used to determine a phase shift between the first and second synchronization signals or a precoding matrix used during transmission of at least one of the first and second synchronization signals.

At 525, UE 115-*b* may obtain communication information (e.g., the communication information identified by base station 105-*b* at 505), further described with reference to FIG. 3. Obtaining the communication information may be based at least in part on a channel correlation between the first channel estimation and the second channel estimation. In some examples, the UE 115-*b* may determine first channel estimation difference based on a first set of sub-carriers or the UE 115-*b* may determine a second channel estimation difference based on a second set of sub-carriers. Using the channel estimation difference or based on the channel correlation, the UE 115-*b* may obtain one or more information bits corresponding to the communication information. At 530, the UE 115-*b* may communicate, with the base station 105-*b*, based at least in part on the communication information.

Figure 6:
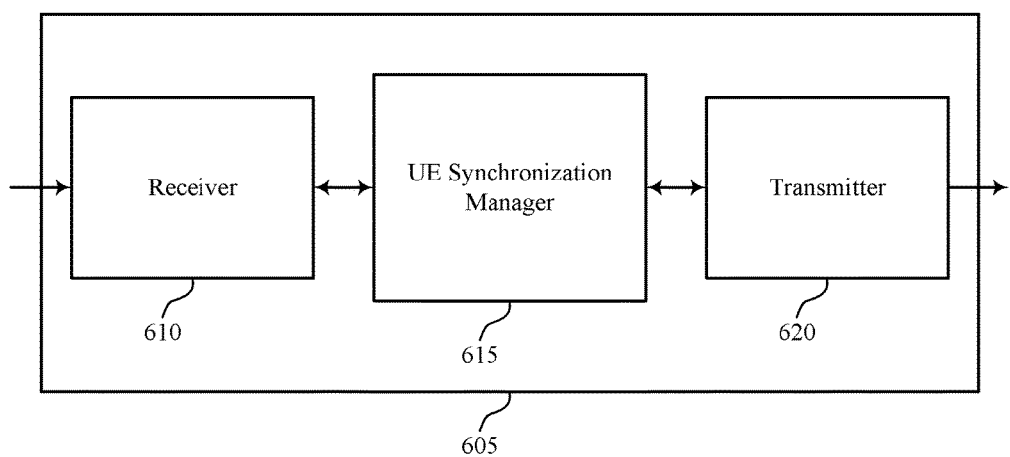
FIGS. 6 through 8 show block diagrams of a device that supports synchronization signal design in accordance with aspects of the present disclosure.

FIG. 6 shows a block diagram 600 of a wireless device 605 that supports synchronization signal design in accordance with various aspects of the present disclosure. Wireless device 605 may be an example of aspects of a UE 115 as described with reference to FIG. 1. Wireless device 605 may include receiver 610, UE synchronization manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to synchronization signal design, etc.). Information may be passed on to other components of the device. The receiver 610 may be an example of aspects of the transceiver 935 described with reference to FIG. 9.

UE synchronization manager 615 may receive a first synchronization signal during a first set of resources and a second synchronization signal during a second set of resources, the first and second synchronization signals associated with a cell. UE synchronization manager 615 may determine a first channel estimation for the first synchronization signal and a second channel estimation for the second synchronization signal. UE synchronization manager 615 may obtain communication information based on a channel correlation between the first channel estimation and the second channel estimation, and communicate, with a base station, based on the communication information. UE synchronization manager 615 may be an example of aspects of the UE synchronization manager 915 described with reference to FIG. 9.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
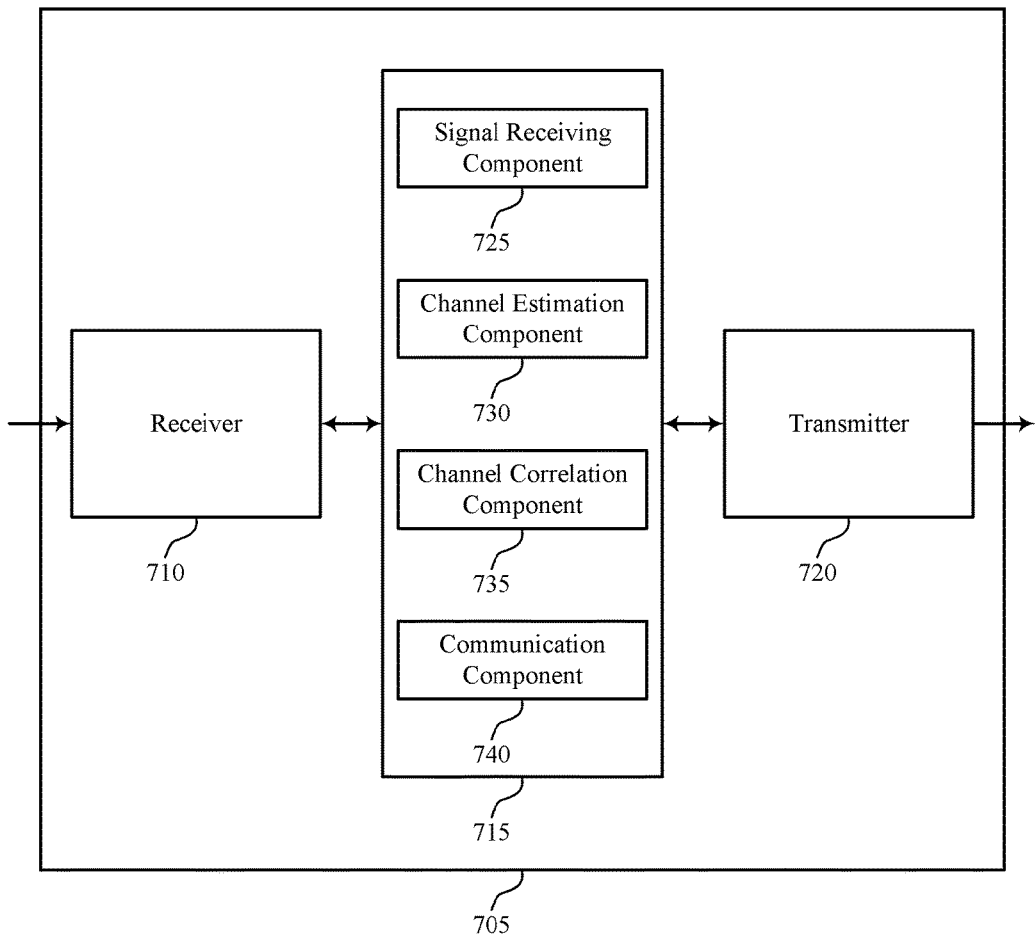

FIG. 7 shows a block diagram 700 of a wireless device 705 that supports synchronization signal design in accordance with various aspects of the present disclosure. Wireless device 705 may be an example of aspects of a wireless device 605 or a UE 115 as described with reference to FIGS. 1 and 6. Wireless device 705 may include receiver 710, UE synchronization manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to synchronization signal design, etc.). Information may be passed on to other components of the device. The receiver 710 may be an example of aspects of the transceiver 935 described with reference to FIG. 9.

UE synchronization manager 715 may be an example of aspects of the UE synchronization manager 915 described with reference to FIG. 9.

UE synchronization manager 715 may also include signal receiving component 725, channel estimation component 730, channel correlation component 735, and communication component 740.

Signal receiving component 725 may receive a first synchronization signal during a first set of resources and a second synchronization signal during a second set of resources, the first and second synchronization signals associated with a cell. In some cases, the first synchronization signal is a primary synchronization signal and the second synchronization signal is a secondary synchronization signal.

Channel estimation component 730 may determine a first channel estimation for the first synchronization signal and a second channel estimation for the second synchronization signal.

Channel correlation component 735 may obtain communication information based on a channel correlation between the first channel estimation and the second channel estimation. In some cases, the communication information indicates a physical channel timing parameter, a physical channel presence indicator, or a system information parameter. In some cases, the physical channel timing parameter includes an indicator of a synchronization periodicity or a PBCH periodicity (e.g., relative position of SSS within a frame, a redundancy version of PBCH), a beam sweep periodicity (e.g., an index of the SSBurst set within PBCH TTI), a CP type, or combinations thereof. In some cases, the physical channel presence indicator includes an indicator of any of a PBCH transmission, an MRS transmission, a beam or channel reference signal transmission, or combinations thereof.

Communication component 740 may communicate, with a base station, based on the communication information.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
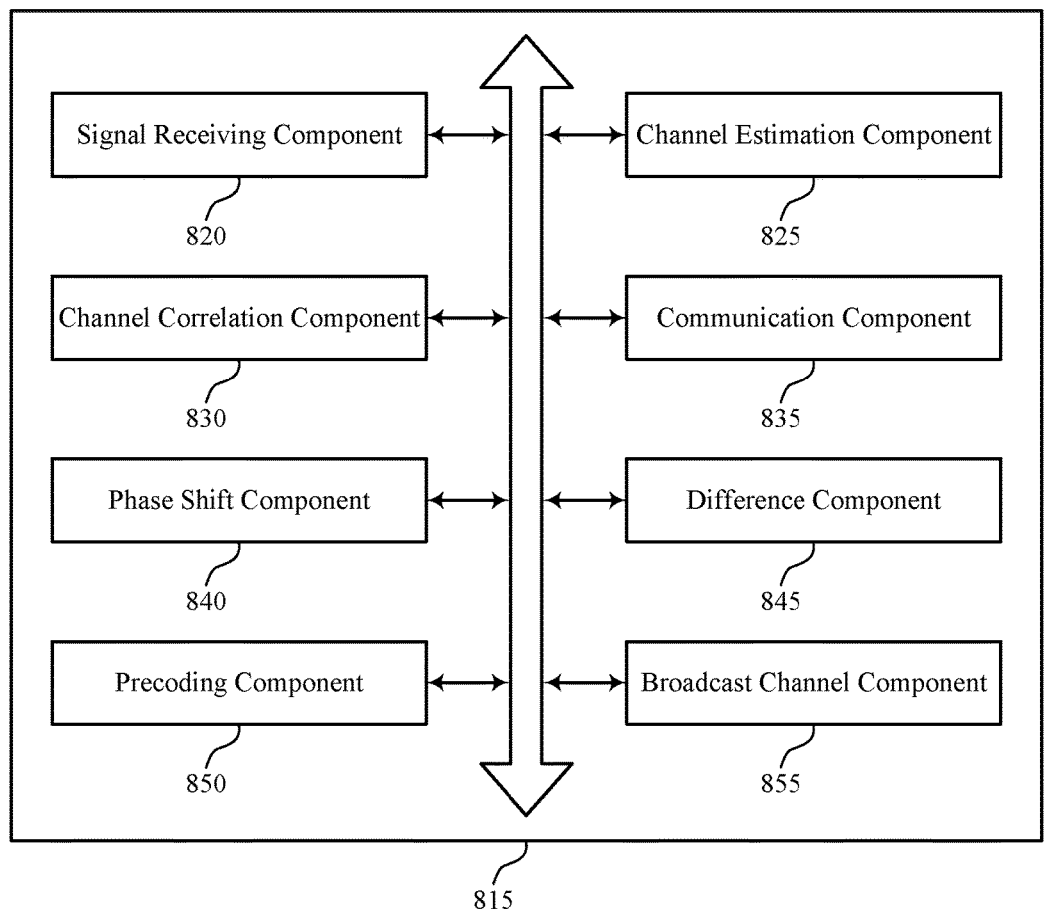

FIG. 8 shows a block diagram 800 of a UE synchronization manager 815 that supports synchronization signal design in accordance with various aspects of the present disclosure. The UE synchronization manager 815 may be an example of aspects of a UE synchronization manager 615, a UE synchronization manager 715, or a UE synchronization manager 915 described with reference to FIGS. 6, 7, and 9. The UE synchronization manager 815 may include signal receiving component 820, channel estimation component 825, channel correlation component 830, communication component 835, phase shift component 840, difference component 845, precoding component 850, and broadcast channel component 855. Each of these modules may communicate, directly or indirectly, with one another (e.g., via one or more buses).

Signal receiving component 820 may receive a first synchronization signal during a first set of resources and a second synchronization signal during a second set of resources, the first and second synchronization signals associated with a cell. In some cases, the first synchronization signal is a primary synchronization signal and the second synchronization signal is a secondary synchronization signal.

Channel estimation component 825 may determine a first channel estimation for the first synchronization signal and a second channel estimation for the second synchronization signal.

Channel correlation component 830 may obtain communication information based on a channel correlation between the first channel estimation and the second channel estimation. In some cases, the communication information indicates a physical channel timing parameter, a physical channel presence indicator, or a system information parameter. In some cases, the physical channel timing parameter includes an indicator of a synchronization periodicity or a PBCH periodicity (e.g., relative position of SSS within a frame, a redundancy version of PBCH), a beam sweep periodicity (e.g., an index of the SSBurst set within PBCH TTI), a CP type, or combinations thereof. In some cases, the physical channel presence indicator includes an indicator of any of a PBCH transmission, an MRS transmission, a beam or channel reference signal transmission, or combinations thereof.

Communication component 835 may communicate, with a base station, based on the communication information.

Phase shift component 840 may determine the communication information based on the phase shift. In some cases, the phase shift component 840 may determine a phase shift between the first synchronization signal and the second synchronization signal based on the first channel estimation and the second channel estimation on a set of sub-carriers.

Difference component 845 may determine a second channel estimation difference between the first channel estimation and the second channel estimation for a second set of sub-carriers and determine one or more information bits corresponding to the communication information based on the first and second channel estimation differences. In some cases, the difference component 845 may determine a first channel estimation difference between the first channel estimation and the second channel estimation for a first set of sub-carriers.

Precoding component 850 may determine a precoding matrix. In some cases, the precoding component 950 may determine the precoding matrix applied to transmission of the first synchronization signal and the second synchronization signal via a set of antenna ports. In some cases, the precoding component 950 may determine one or more information bits based at least in part on the precoding matrix.

Broadcast channel component 855 may demodulate a broadcast channel based on the first synchronization signal, the second synchronization signal, or a combination thereof.

Figure 9:
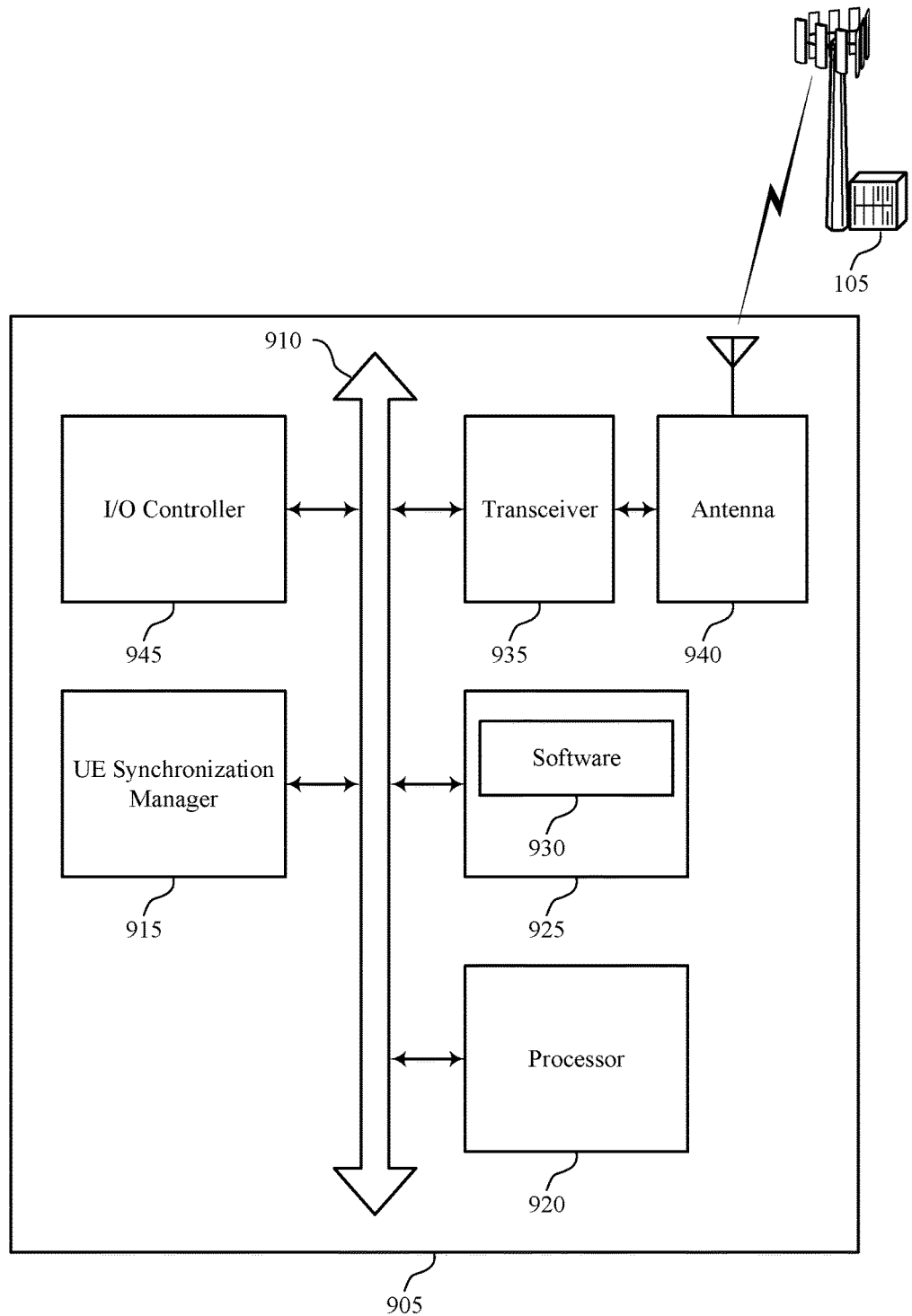
FIG. 9 illustrates a block diagram of a system including a user equipment (UE) that supports synchronization signal design in accordance with aspects of the present disclosure.

FIG. 9 shows a diagram of a system 900 including a device 905 that supports synchronization signal design in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE synchronization manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting synchronization signal design).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support synchronization signal design. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
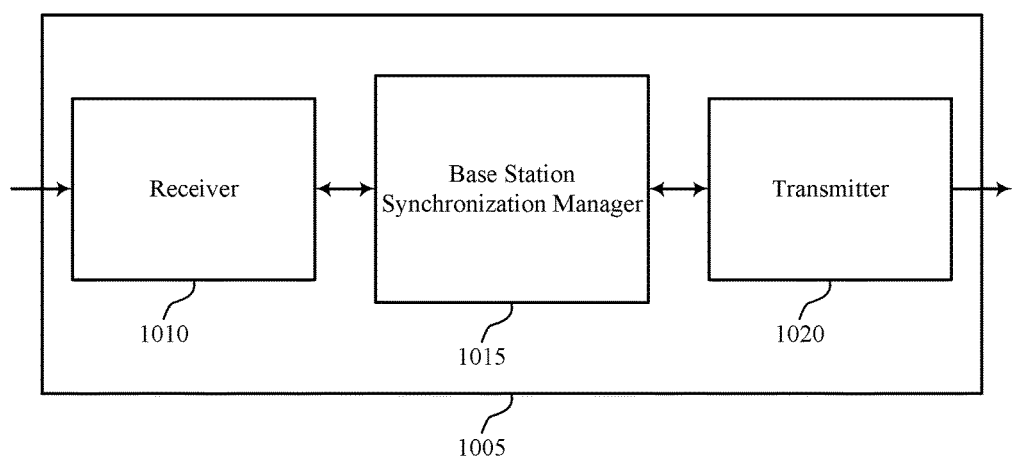
FIGS. 10 through 12 show block diagrams of a device that supports synchronization signal design in accordance with aspects of the present disclosure.

FIG. 10 shows a block diagram 1000 of a wireless device 1005 that supports synchronization signal design in accordance with various aspects of the present disclosure. Wireless device 1005 may be an example of aspects of a base station 105 as described with reference to FIG. 1. Wireless device 1005 may include receiver 1010, base station synchronization manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to synchronization signal design, etc.). Information may be passed on to other components of the device. The receiver 1010 may be an example of aspects of the transceiver 1335 described with reference to FIG. 13.

Base station synchronization manager 1015 may be an example of aspects of the base station synchronization manager 1315 described with reference to FIG. 13.

Base station synchronization manager 1015 may identify communication information associated with a cell, establish a precoding relationship between a first synchronization signal and a second synchronization signal, the precoding relationship indicating the communication information, and transmit, based on the precoding relationship, the first synchronization signal during a first symbol period and the second synchronization signal during a second symbol period.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
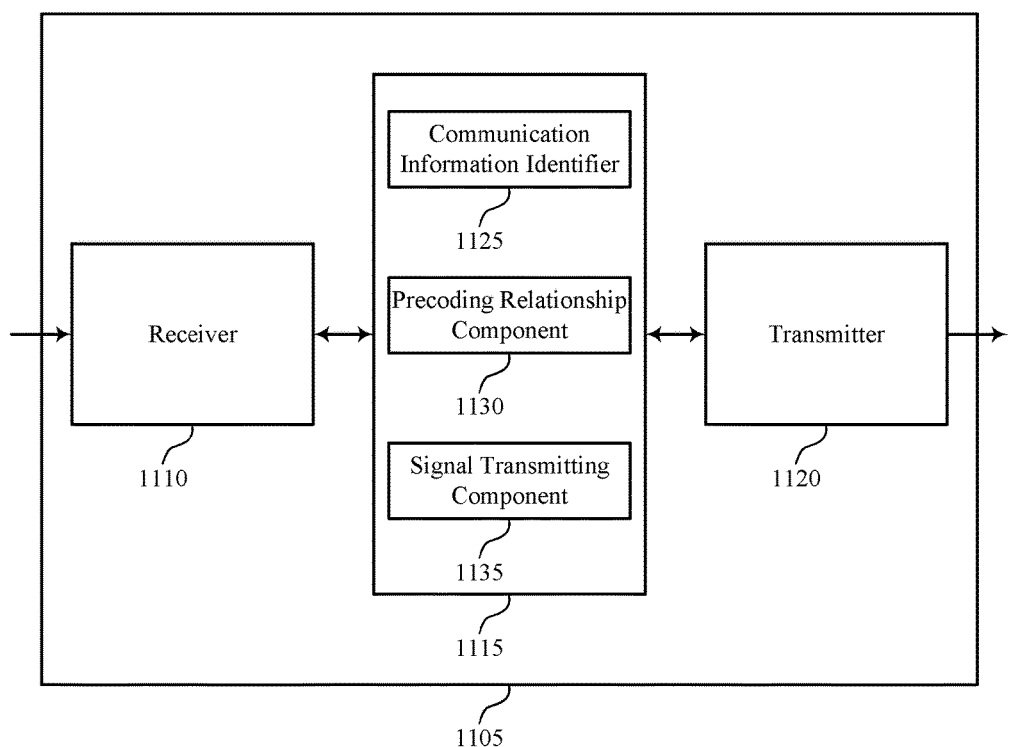

FIG. 11 shows a block diagram 1100 of a wireless device 1105 that supports synchronization signal design in accordance with various aspects of the present disclosure. Wireless device 1105 may be an example of aspects of a wireless device 1005 or a base station 105 as described with reference to FIGS. 1 and 10. Wireless device 1105 may include receiver 1110, base station synchronization manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to synchronization signal design, etc.). Information may be passed on to other components of the device. The receiver 1110 may be an example of aspects of the transceiver 1335 described with reference to FIG. 13.

Base station synchronization manager 1115 may be an example of aspects of the base station synchronization manager 1315 described with reference to FIG. 13.

Base station synchronization manager 1115 may also include communication information identifier 1125, precoding relationship component 1130, and signal transmitting component 1135.

Communication information identifier 1125 may identify communication information associated with a cell. In some cases, the communication information indicates a physical channel timing parameter, a physical channel presence indicator, or a system information parameter. In some cases, the physical channel timing parameter includes an indicator of any of a synchronization periodicity or a PBCH periodicity (e.g., relative position of SSS within a frame, a redundancy version of PBCH), a beam sweep periodicity (e.g., an index of the SSBurst set within PBCH TTI), a CP type, or combinations thereof. In some cases, the physical channel presence indicator includes an indicator of any of a PBCH transmission, an MRS transmission, a beam or channel reference signal transmission, or combinations thereof.

Precoding relationship component 1130 may establish a precoding relationship between a first synchronization signal and a second synchronization signal, the precoding relationship indicating the communication information.

Signal transmitting component 1135 may transmit, based on the precoding relationship, the first synchronization signal during a first set of resources and the second synchronization signal during a second set of resources. In some cases, the first synchronization signal is a primary synchronization signal and the second synchronization signal is a secondary synchronization signal.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
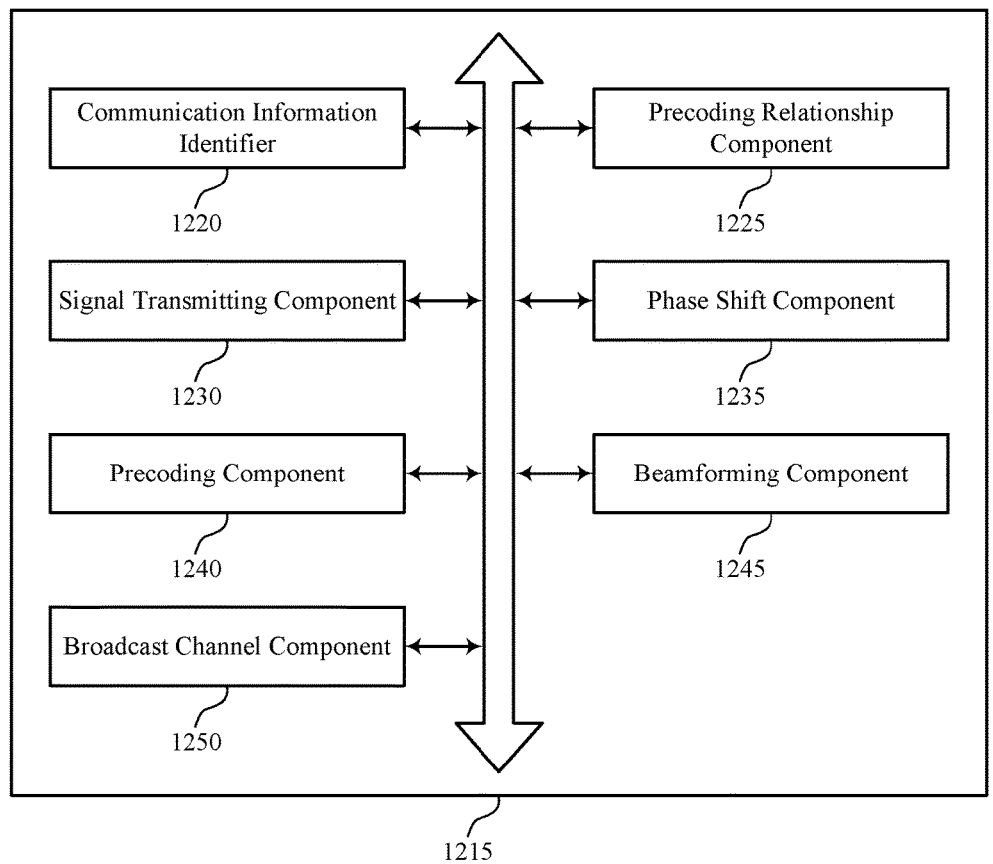

FIG. 12 shows a block diagram 1200 of a base station synchronization manager 1215 that supports synchronization signal design in accordance with various aspects of the present disclosure. The base station synchronization manager 1215 may be an example of aspects of a base station synchronization manager 1315 described with reference to FIGS. 10, 11, and 13. The base station synchronization manager 1215 may include communication information identifier 1220, precoding relationship component 1225, signal transmitting component 1230, phase shift component 1235, precoding component 1240, beamforming component 1245, and broadcast channel component 1250. Each of these modules may communicate, directly or indirectly, with one another (e.g., via one or more buses).

Communication information identifier 1220 may identify communication information associated with a cell. In some cases, the communication information indicates a physical channel timing parameter, a physical channel presence indicator, or a system information parameter. In some cases, the physical channel timing parameter includes an indicator of a synchronization periodicity or a PBCH periodicity (e.g., relative position of SSS within a frame, a redundancy version of PBCH), a beam sweep periodicity (e.g., an index of the SSBurst set within PBCH TTI), a CP type, or combinations thereof. In some cases, the physical channel presence indicator includes an indicator of any of a PBCH transmission, an MRS transmission, a beam or channel reference signal transmission, or combinations thereof.

Precoding relationship component 1225 may establish a precoding relationship between a first synchronization signal and a second synchronization signal, the precoding relationship indicating the communication information.

Signal transmitting component 1230 may transmit, based on the precoding relationship, the first synchronization signal during a first set of resources and the second synchronization signal during a second set of resources. In some cases, the first synchronization signal is a primary synchronization signal and the second synchronization signal is a secondary synchronization signal.

Phase shift component 1235 may transmit the PBCH during a third symbol period, based at least in part on the precoding relationship. In some cases, the phase shift component 1235 may establish a phase shift between the first synchronization signal and the second synchronization signal. In some cases, the phase shift component 1235 may transmit the first and second synchronization signals based on the phase shift. In some cases, the phase shift component 1235 may establish a phase shift between the PBCH and either the first synchronization signal or the second synchronization signal.

Precoding component 1240 may transmit the PBCH based at least in part on the precoding matrix. In some cases, the precoding component 1240 may determine a precoding matrix for transmission of the first synchronization signal and the second synchronization signal via a set of antenna ports. In some cases, the precoding component 1240 may transmit the first and second synchronization signals based at least in part on the precoding matrix. In some cases, the precoding component 1240 may determine a precoding matrix for transmission of the PBCH via a set of antenna ports based on the channel correlation.

Beamforming component 1245 may determine different beamforming coefficients. In some cases, the beamforming component 1245 may transmit a set of synchronization signal blocks including the first synchronization signal and the second synchronization signal using one or more of the different beamforming coefficients.

Broadcast channel component 1250 may transmit, based on the channel correlation, a PBCH during a third symbol period.

Figure 13:
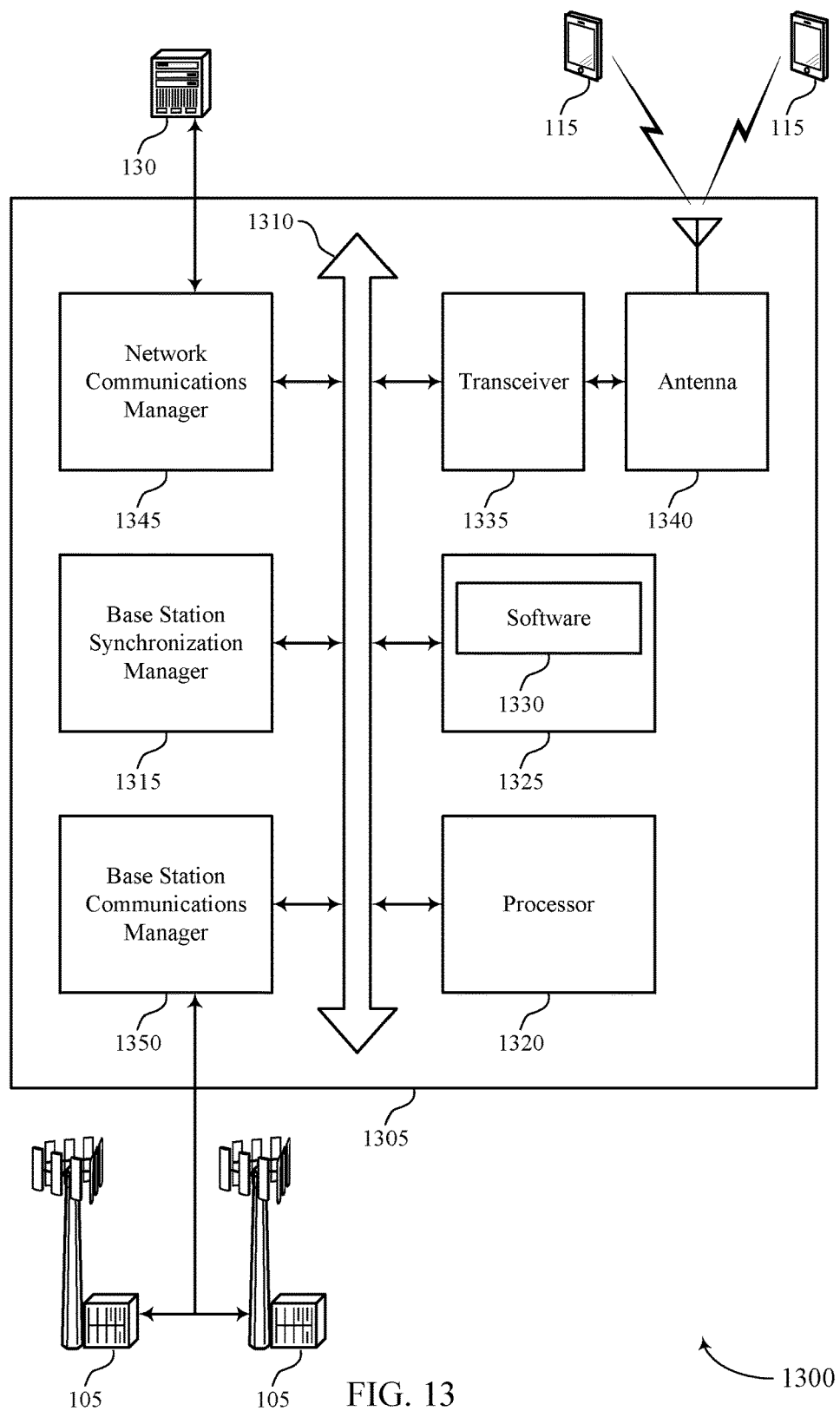
FIG. 13 illustrates a block diagram of a system including a base station that supports synchronization signal design in accordance with aspects of the present disclosure.

FIG. 13 shows a diagram of a system 1300 including a device 1305 that supports synchronization signal design in accordance with various aspects of the present disclosure. Device 1305 may be an example of or include the components of base station 105 as described above, e.g., with reference to FIG. 1. Device 1305 may include components for bi-directional voice and data communications including components for transmitting and receiving communications, including base station synchronization manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting synchronization signal design).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support synchronization signal design. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
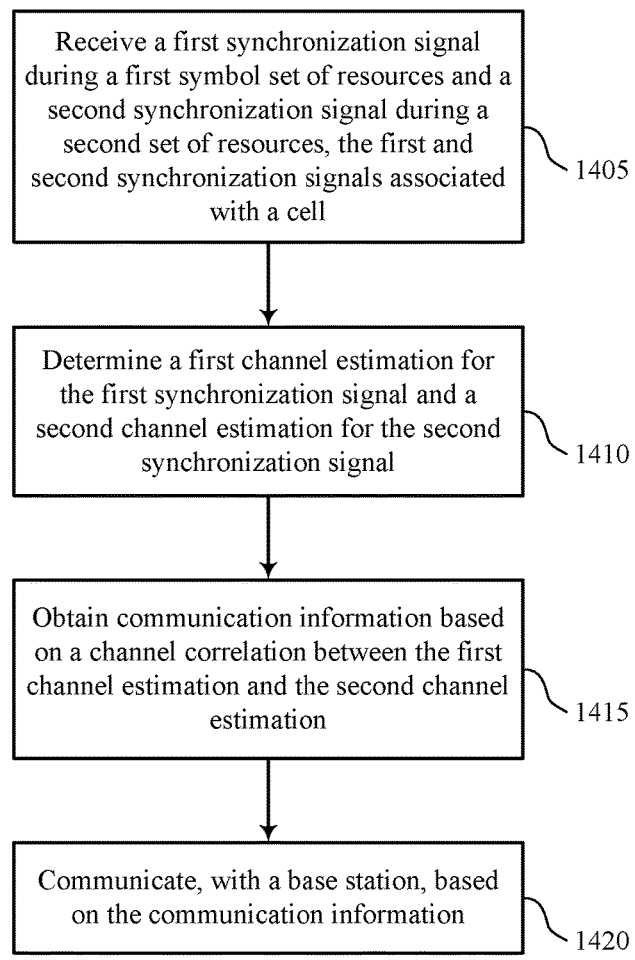
FIGS. 14 through 15 illustrate methods for synchronization signal design in accordance with aspects of the present disclosure.

FIG. 14 shows a flowchart illustrating a method 1400 for synchronization signal design in accordance with various aspects of the present disclosure. The operations of method 1400 may be implemented by a UE 115 or its components as described herein. For example, the operations of method 1400 may be performed by a UE synchronization manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1405 the UE 115 may receive a first synchronization signal during a first set of resources and a second synchronization signal during a second set of resources, the first and second synchronization signals associated with a cell. The operations of block 1405 may be performed according to the methods described with reference to FIGS. 1 through 5. In certain examples, aspects of the operations of block 1405 may be performed by a signal receiving component as described with reference to FIGS. 6 through 9.

At block 1410 the UE 115 may determine a first channel estimation for the first synchronization signal and a second channel estimation for the second synchronization signal. The operations of block 1410 may be performed according to the methods described with reference to FIGS. 1 through 5. In certain examples, aspects of the operations of block 1410 may be performed by a channel estimation component as described with reference to FIGS. 6 through 9.

At block 1415 the UE 115 may obtain communication information based at least in part on a channel correlation between the first channel estimation and the second channel estimation. The operations of block 1415 may be performed according to the methods described with reference to FIGS. 1 through 5. In certain examples, aspects of the operations of block 1415 may be performed by a channel correlation component as described with reference to FIGS. 6 through 9.

At block 1420 the UE 115 may communicate, with a base station, based at least in part on the communication information. The operations of block 1420 may be performed according to the methods described with reference to FIGS. 1 through 5. In certain examples, aspects of the operations of block 1420 may be performed by a communication component as described with reference to FIGS. 6 through 9.

Figure 15:
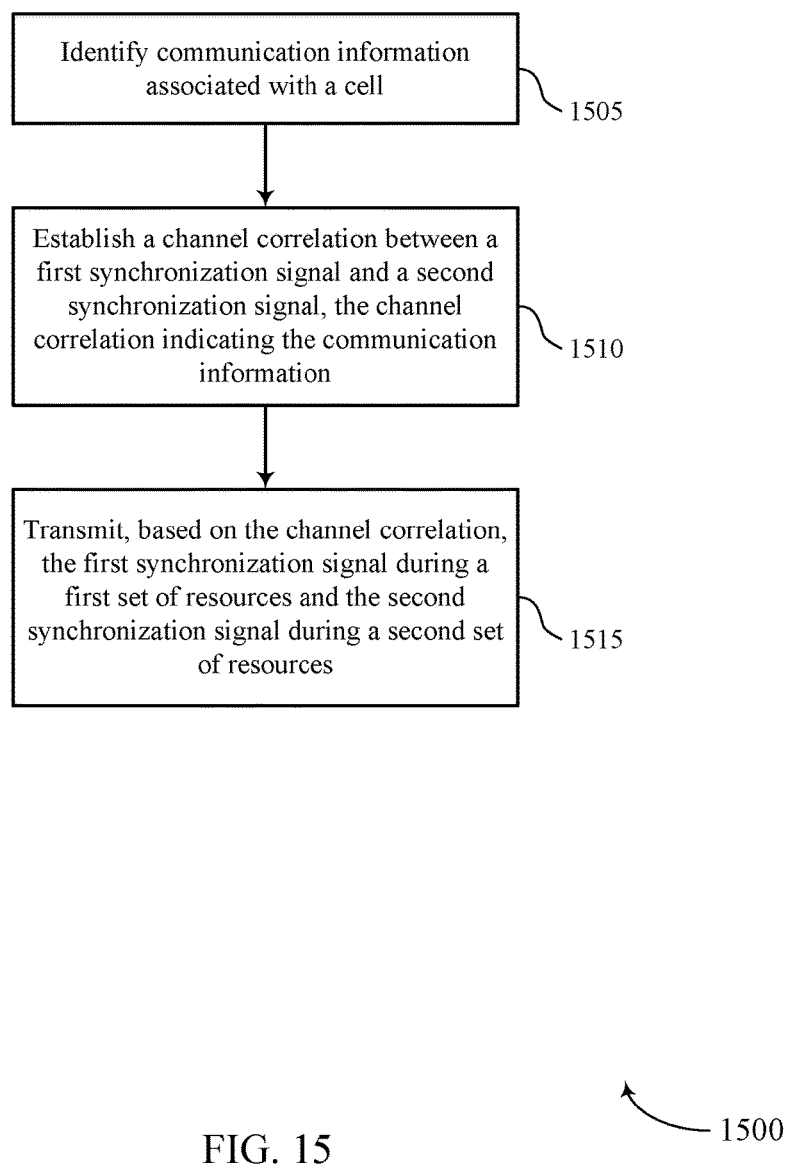

FIG. 15 shows a flowchart illustrating a method 1500 for synchronization signal design in accordance with various aspects of the present disclosure. The operations of method 1500 may be implemented by a base station 105 or its components as described herein. For example, the operations of method 1500 may be performed by a base station synchronization manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify communication information associated with a cell. The operations of block 1505 may be performed according to the methods described with reference to FIGS. 1 through 5. In certain examples, aspects of the operations of block 1505 may be performed by a communication information identifier as described with reference to FIGS. 10 through 13.

At block 1510 the base station 105 may establish a precoding relationship between a first synchronization signal and a second synchronization signal, the precoding relationship indicating the communication information. The operations of block 1510 may be performed according to the methods described with reference to FIGS. 1 through 5. In certain examples, aspects of the operations of block 1510 may be performed by a channel correlation component as described with reference to FIGS. 10 through 13.

At block 1515 the base station 105 may transmit, based at least in part on the precoding relationship, the first synchronization signal during a first set of resources and the second synchronization signal during a second set of resources. The operations of block 1515 may be performed according to the methods described with reference to FIGS. 1 through 5. In certain examples, aspects of the operations of block 1515 may be performed by a signal transmitting component as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). "3rd Generation Partnership Project" (3GPP) LTE and LTE-A are releases of UMTS that use E-UTRA. UTRA, E-UTRA, UMTS, LTE, LTE-A, NR, and GSM are described in documents from the organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB) or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a first synchronization signal during a first set of resources and a second synchronization signal during a second set of resources, the first and second synchronization signals associated with a cell;
   determining a first channel estimation for the first synchronization signal and a second channel estimation for the second synchronization signal;
   obtaining communication information based at least in part on a channel correlation between the first channel estimation and the second channel estimation, wherein obtaining the communication information comprises:
      determining a first channel estimation difference between the first channel estimation and the second channel estimation for a first set of sub-carriers;
      determining a second channel estimation difference between the first channel estimation and the second channel estimation for a second set of sub-carriers; and
      determining one or more information bits corresponding to the communication information based at least in part on the first and second channel estimation differences; and
   communicating, with a base station, based at least in part on the communication information.

2. The method of claim 1, wherein the determining the one or more information bits comprises determining the precoding matrix applied to transmission of the first synchronization signal and the second synchronization signal via a plurality of antenna ports.

3. The method of claim 1, wherein the first synchronization signal is one of a primary synchronization signal, a secondary synchronization signal, a first demodulation reference signal, or a first beam reference signal, and the second synchronization signal is one of the secondary synchronization signal, a second demodulation reference signal, or a second beam reference signal.

4. The method of claim 1, further comprising:
   demodulating a broadcast channel based at least in part on the first synchronization signal, the second synchronization signal, or a combination thereof.

5. The method of claim 1, wherein the communication information indicates a physical channel timing parameter, a physical channel presence indicator, or a system information parameter.

6. The method of claim 5, wherein the system information parameter comprises an indicator of an operation mode.

7. The method of claim 6, wherein the operation mode may be one of an initial acquisition, synchronization, or beam or mobility management, in an RRC-idle or RRC-connected mode.

8. The method of claim 5, wherein the physical channel timing parameter comprises an indicator of any of a synchronization periodicity, a physical broadcast channel (PBCH) periodicity, a beam sweep periodicity, a cyclic prefix (CP) type, a part of a system frame number, a part of a symbol-level timing information, or combinations thereof.

9. The method of claim 5, wherein the physical channel presence indicator comprises an indicator of any of a PBCH transmission, a mobility reference signal (MRS) transmission, a beam or channel reference signal transmission, or combinations thereof.

10. A method for wireless communication, comprising:
    identifying communication information associated with a cell;
    determining a precoding matrix for a first synchronization signal and a second synchronization signal, wherein the precoding matrix comprises a first precoding relationship between the first synchronization signal and the second synchronization signal for a first set of subcarriers and a second precoding relationship between the first synchronization signal and the second synchronization signal for a second set of subcarriers, and wherein the first and second precoding relationships indicate the communication information; and
    transmitting, based at least in part on the first and second precoding relationships, the first synchronization signal during a first set of resources and the second synchronization signal during a second set of resources.

11. The method of claim 10, wherein:
the determining the precoding matrix comprises determining the precoding matrix for transmission of the first synchronization signal and the second synchronization signal via a plurality of antenna ports; and
the transmitting the first and second synchronization signals is based at least in part on the precoding matrix.

12. The method of claim 10, wherein the transmitting comprises transmitting a plurality of synchronization signal blocks comprising the first synchronization signal and the second synchronization signal with different beamforming coefficients.

13. The method of claim 10, wherein the first synchronization signal is one of a primary synchronization signal, a secondary synchronization signal, a first demodulation reference signal, or a first beam reference signal, and the second synchronization signal is one of the secondary synchronization signal, a second demodulation reference signal, or a second beam reference signal.

14. The method of claim 10, wherein:
the communication information indicates a physical channel timing parameter, a physical channel presence indicator, or a system information parameter, wherein the system information parameter comprises an indicator of an operation mode.

15. The method of claim 14, wherein the operation mode may be one of an initial acquisition, synchronization, or beam or mobility management, in an RRC-idle or RRC-connected mode.

16. The method of claim 14, wherein the physical channel timing parameter comprises an indicator of any of a synchronization periodicity, a physical broadcast channel (PBCH) periodicity, a beam sweep periodicity, a cyclic prefix (CP) type, a part of a system frame number, a part of a symbol-level information, or combinations thereof.

17. The method of claim 14, wherein the physical channel presence indicator comprises an indicator of any of a physical broadcast channel (PBCH) transmission, a mobility reference signal (MRS) transmission, a beam or channel reference signal transmission, or combinations thereof.

18. The method of claim 10, further comprising:
transmitting, based at least in part on the precoding matrix, a physical broadcast channel (PBCH) during a third set of resources.

19. The method of claim 18, wherein transmitting the PBCH comprises:
establishing the first precoding relationship between the PBCH and either the first synchronization signal or the second synchronization signal for the first set of subcarriers and the second precoding relationship between the PBCH and either the first synchronization signal or the second synchronization signal for the second set of subcarriers; and
the method further comprising transmitting the PBCH based at least in part on the first precoding relationship and the second precoding relationship.

20. The method of claim 18, wherein transmitting the PBCH comprises:
determining the precoding matrix for transmission of the PBCH via a plurality of antenna ports; and
the method further comprising transmitting the PBCH based at least in part on the precoding matrix.

21. An apparatus for wireless communication, comprising:
a processor;
memory in electronic communication with the processor; and
instructions stored in the memory and operable, when executed by the processor, to cause the apparatus to:
receive a first synchronization signal during a first set of resources and a second synchronization signal during a second set of resources, the first and second synchronization signals associated with a cell;
determine a first channel estimation for the first synchronization signal and a second channel estimation for the second synchronization signal;
obtain communication information based at least in part on a channel correlation between the first channel estimation and the second channel estimation, wherein the instructions to obtain communication information are further operable, when executed by the processor, to cause the apparatus to:
determine a first channel estimation difference between the first channel estimation and the second channel estimation for a first set of sub-carriers;
determine a second channel estimation difference between the first channel estimation and the second channel estimation for a second set of sub-carriers; and
determine one or more information bits corresponding to the communication information based at least in part on the first and second channel estimation differences; and
communicate, with a base station, based at least in part on the communication information.

22. The apparatus of claim 21, wherein the instructions are further operable, when executed by the processor, to cause the apparatus to determine a precoding matrix applied to transmission of the first synchronization signal and the second synchronization signal via a plurality of antenna ports.

23. The apparatus of claim 22, wherein the instructions are further operable, when executed by the processor, to cause the apparatus to:
demodulate a broadcast channel based at least in part on the first synchronization signal, the second synchronization signal, or a combination thereof.

24. An apparatus for wireless communication, comprising:
a processor;
memory in electronic communication with the processor; and
instructions stored in the memory and operable, when executed by the processor, to cause the apparatus to:
identify communication information associated with a cell;
determine a precoding matrix for a first synchronization signal and a second synchronization signal, wherein the precoding matrix comprises a first precoding relationship between the first synchronization signal and the second synchronization signal for a first set of subcarriers and a second precoding relationship between the first synchronization signal and the second synchronization signal for a second set of subcarriers, and wherein the first and second precoding relationships indicate the communication information; and
transmit, based at least in part on the first and second precoding relationships, the first synchronization signal during a first set of resources and the second synchronization signal during a second set of resources.

25. The apparatus of claim 24, wherein the instructions are operable, when executed by the processor, to cause the apparatus to:

determine the precoding matrix for transmission of the first synchronization signal and the second synchronization signal via a plurality of antenna ports; and transmit the first and second synchronization signals based at least in part on the precoding matrix.

26. The apparatus of claim 24, wherein the instructions are operable, when executed by the processor, to cause the apparatus to:

transmit a plurality of synchronization signal blocks comprising the first synchronization signal and the second synchronization signal with different beamforming coefficients.

27. The apparatus of claim 24, wherein the first synchronization signal is one of a primary synchronization signal, a secondary synchronization signal, a first demodulation reference signal, or a first beam reference signal, and the second synchronization signal is one of the secondary synchronization signal, a second demodulation reference signal, or a second beam reference signal.

28. The apparatus of claim 24, wherein the communication information indicates a physical channel timing parameter, a physical channel presence indicator, or a system information parameter, wherein the system information parameter comprises an indicator of an operation mode.

29. The apparatus of claim 28, wherein the operation mode may be one of an initial acquisition, synchronization, or beam or mobility management, in an RRC-idle or RRC-connected mode.

30. The apparatus of claim 28, wherein the physical channel timing parameter comprises an indicator of any of a synchronization periodicity, a physical broadcast channel (PBCH) periodicity, a beam sweep periodicity, a cyclic prefix (CP) type, a part of a system frame number, a part of a symbol-level information, or combinations thereof.

* * * * *